(12) United States Patent
Hesselbarth et al.

(10) Patent No.: US 12,483,342 B2
(45) Date of Patent: Nov. 25, 2025

(54) MEASUREMENT ARRANGEMENT FOR CHARACTERIZING A RADIO FREQUENCY ARRANGEMENT HAVING A PLURALITY OF ANTENNAS

(71) Applicant: Advantest Corporation, Tokyo (JP)

(72) Inventors: Jan Hesselbarth, Stuttgart (DE); José Moreira, Stuttgart (DE); Serafin Fischer, Stuttgart (DE)

(73) Assignee: Advantest Corporation, Tokyo (JP)

( * ) Notice: Subject to any disclaimer, the term of this patent is extended or adjusted under 35 U.S.C. 154(b) by 236 days.

(21) Appl. No.: 18/344,202

(22) Filed: Jun. 29, 2023

(65) Prior Publication Data

US 2023/0353259 A1 Nov. 2, 2023

Related U.S. Application Data

(63) Continuation of application No. PCT/EP2021/086040, filed on Dec. 15, 2021.

(51) Int. Cl.
*G01R 29/08* (2006.01)
*H04B 17/00* (2015.01)
(Continued)

(52) U.S. Cl.
CPC ......... *H04B 17/29* (2015.01); *H04B 17/0085* (2013.01); *H04B 17/15* (2015.01)

(58) Field of Classification Search
CPC .............. G01R 29/0871; G01R 23/005; G01R 29/0821; G01R 29/0878; H04B 17/29;
(Continued)

(56) References Cited

U.S. PATENT DOCUMENTS 6,026,913 A 2/2000 Mandal et al.
6,480,153 B1 * 11/2002 Jung ...................... H01Q 3/267
342/368

(Continued)

FOREIGN PATENT DOCUMENTS

CN 103988091 A 8/2014
EP 3671233 6/2020
(Continued)

*Primary Examiner* — Angelica Perez

(57) ABSTRACT

An embodiment provides a measurement arrangement for characterizing a radio frequency arrangement comprising a plurality of antennas. Measurement arrangement comprises a dielectric waveguide slab with a plurality of frequency converting structures, arranged in or on the dielectric waveguide slab. Measurement arrangement further comprises a plurality of waveguide transitions arranged at different positions of the dielectric waveguide slab and are coupled to respective radio frequency components. Radio frequency components are configured to transmit and/or receive radio signals. Frequency converting structures are associated with respective antennas of the plurality of antennas, and are configured to perform a frequency conversion on signals received, resulting in frequency-converted signals. Frequency converting structures are further configured to couple respective antennas with the dielectric slab in a frequency converting manner to establish a frequency-converting coupling between the antennas and the plurality of waveguide transitions to cause a frequency-converting coupling between the antennas and the radio frequency components.

28 Claims, 19 Drawing Sheets

(51) Int. Cl.
*H04B 17/15* (2015.01)
*H04B 17/29* (2015.01)

(58) Field of Classification Search
CPC ....... H04B 17/0085; H04B 17/15; H01S 5/00; H10F 30/20; H10H 20/80
See application file for complete search history.

(56) References Cited

U.S. PATENT DOCUMENTS

| | | | |
|---|---|---|---|
| 10,935,584 B2 * | 3/2021 | Kong | G01R 29/0878 |
| 2009/0224858 A1 | 9/2009 | Fujita | |
| 2014/0370821 A1 | 12/2014 | Guterman et al. | |
| 2017/0141479 A1 * | 5/2017 | Apostolos | H01Q 21/22 |
| 2019/0190624 A1 * | 6/2019 | Kyosti | H04B 7/0413 |
| 2020/0358177 A1 * | 11/2020 | Ge | H01Q 3/2611 |

FOREIGN PATENT DOCUMENTS

| | | | | |
|---|---|---|---|---|
| JP | 2016-151550 A | 8/2016 | | |
| JP | 2021-530888 A | 11/2021 | | |
| KR | 10-2021-0021399 | 2/2021 | | |
| WO | 2016153459 | 9/2016 | | |
| WO | WO-2016153459 A1 * | 9/2016 | ......... | H01Q 21/0068 |

* cited by examiner

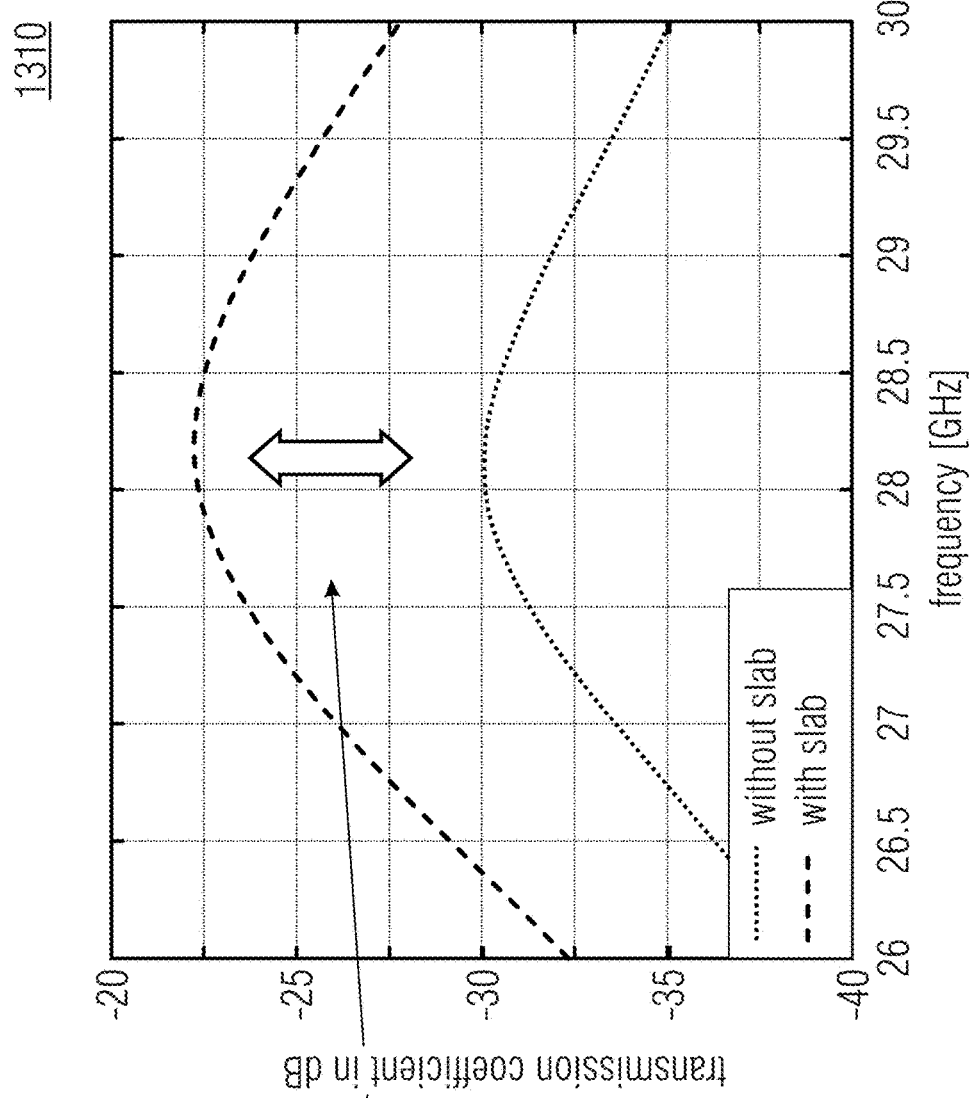
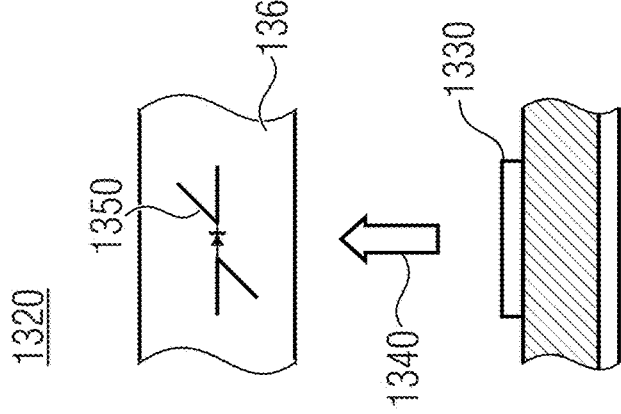
Fig. 13a
Fig. 13b transmission from the sensor antenna to the probe

MEASUREMENT ARRANGEMENT FOR CHARACTERIZING A RADIO FREQUENCY ARRANGEMENT HAVING A PLURALITY OF ANTENNAS

CROSS-REFERENCE TO RELATED APPLICATION

This application is a continuation of copending International Application No. PCT/EP2021/086040, filed Dec. 15, 2021, which is incorporated herein by reference in its entirety.

TECHNICAL FIELD

The present disclosure relates to over-the-air (OTA) antenna testing. The present disclosure relates to a measurement arrangement for characterizing a radio frequency arrangement comprising a plurality of antennas. Further embodiments according to the present disclosure relate to an automated test equipment comprising the measurement arrangement and a device under test location. Further embodiments according to the present disclosure relate to a method for characterizing a device under test (DUT) comprising a plurality of antennas. Embodiments according to the present disclosure relate to near-field testing or probing by using a frequency converting structure or sensor. Embodiments according to the present disclosure relate to OTA testing a large mm-wave antenna array module.

BACKGROUND OF THE DISCLOSURE

Several conventional methods exist for OTA testing an antenna array. For example, antenna arrays can be tested by probing them at a large distance, e.g., from slightly less than 1 meter up to several meters, in an anechoic chamber or in a box environment. Drawback of this conventional method is that these measurements are slow and the equipments are large, with a result, that this method is not suited for a clean production environment.

Modules containing small arrays, e.g., 4-8 elements, can be tested at a small distance, for example, at around half a meter, using a few absorbers. This measurement method is reasonably better suited for production environments than the large distance method discussed above. But this method remains time-consuming as the numerous array elements are tested sequentially.

A recent measurement method proposes that modules containing small arrays, such as 4-8 elements, can be probed or tested with probe adaptors in the reactive near field of antenna elements. This measurement setup is compact and allows parallel measurements of array elements, therefore it is well suited for an application in production tests. The disadvantage is that for a given array topology, a rather complex purpose-made probe adaptor is required, which suffers from further growing complexity as the number of array elements grows.

Even if the above-mentioned methods solve, at least partially, problems of testing modules containing small arrays with, for example, 4-8 elements, they are not capable of testing future mobile communication devices. It is expected that future mobile communication devices will contain several complex antenna arrays in a small form factor operating at millimeter-wave frequency.

Also, frontend electronics and antennas are expected to be co-integrated into modules, in order to avoid the usage of millimeter-wave interconnects. Thus, the point between transceiver and antenna will not be accessible for testing.

Moreover, many-antenna millimeter-wave modules are expected to require OTA testing, e.g. testing per-element or per-channel, and potentially OTA calibration at production level.

In a view of this situation, there is a need for a measurement arrangement and a concept which brings along an improved compromise between complexity, size and cost for testing device under tests (DUTs) comprising antenna arrays with large number of antenna elements.

SUMMARY OF THE DISCLOSURE

An embodiment according to the present disclosure is a measurement arrangement for characterizing, e.g., testing or measuring, a radio frequency arrangement comprising a plurality of antennas, such as patch antennas or a large array of patch antennas.

The measurement arrangement comprises a dielectric waveguide slab, or a dielectric slab, with a plurality of frequency converting structures, e.g., frequency converting sensors, arranged in or on the dielectric waveguide slab.

The measurement arrangement further comprises a plurality of waveguide transitions arranged at different positions of the dielectric waveguide slab, e.g., along a circumference of the dielectric waveguide slab, and coupled to respective radio frequency components.

The radio frequency components are configured to transmit and/or receive radio signals, like transmitters, receivers or transceivers.

The frequency converting structures are associated with respective antennas of the plurality of antennas, and are configured to perform a frequency conversion on radio signals received, resulting in frequency-converted signals.

The frequency converting structures are further configured to couple respective antennas with the dielectric slab in a frequency converting manner to establish a frequency-converting coupling between the antennas and the plurality of waveguide transitions to cause a frequency-converting coupling between the antennas and the radio frequency components.

The measurement arrangement is configured to use the frequency-converting coupling between the antennas and the radio frequency components for characterizing the radio frequency arrangement. For example, radio frequency arrangements can comprise antennas and/or radio frequency frontends connected to the antennas.

The inventive measurement arrangement allows to test large antenna arrays, with a large number of antenna elements, in a compact setup suitable for a production environment with a reasonable number of testing channels operating in parallel.

With the use of a test probe adapter, which may be specific for the plurality of antennas of the DUT or for the antennas under test, the measurement arrangement is manufacturable in or with a technology of reasonable low complexity. The low complexity makes the measurement arrangement easy to manufacture and/or use in a production environment. Therefore, it is an important differentiator to the above-discussed conventional reactive-near-field probing techniques or measurement arrangements.

The antenna array of the DUT may comprise many separate radiators or a plurality of antennas. The antenna array or the radiators/antennas of the DUT may radiate or transmit signals into a direction of an absorber in a not-so-far distance, like in an around 10 wavelength distance.

Without disturbing the radiator, that is the complex feed impedance of the radiator remains unaffected, a dielectric waveguide slab with a thickness of less than a half of a free-space wavelength may be placed at a close-by distance or at a near-field distance to the radiator, between the antenna array and the absorbers.

The dielectric slab may have two functionalities. First, it may comprise or carry at locations close to each radiator tiny antenna-diode circuits, which are small, compared to the wavelength of the transmitted signal and thus will not affect the radiator. As the tiny antenna-diode circuits are comprised by the dielectric waveguide slab, they can also be called as on-slab-circuits.

A small, inefficient antenna of the on-slab-circuit may receive a small fraction of the wave or signal transmitted by the radiator. The diode or other non-linear element of the on-slab-circuit may convert or transfer the received signal to another frequency, for example, by doubling its frequency. Finally, the on-slab-circuit may transmit, e. g. by means of a small mode launcher, the frequency-converted or transferred-frequency signal to the dielectric waveguide slab guided surface-wave mode.

Then, by second functionality of the dielectric waveguide slab, the dielectric waveguide slab may guide or carry the surface-wave mode to the outer edges of the dielectric waveguide slab.

Mode launchers and receivers along the circumference of the dielectric waveguide slab may receive the signal, for example through waveguide transitions. For example by applying a phase-comparison of or on several received radio signals, e.g. as a sort of triangulation, the specific location of the radiator of the DUT can be found. The triangulation can, for example, be further improved by comparing both the magnitude and phase information of the different received versions of the same transmitted signals.

Important features of this inventive measurement arrangement can be concluded as follows. First, the frequency converting structures (or probes) may be electrically isolated device structures, such as an antenna and a diode, located in or on a planar dielectric waveguide slab. Therefore, the manufacture of the dielectric waveguide slab with the frequency converting structures (or probe card) specific to a given antenna array to be tested and operating at a millimeter-wave frequency is, for example, feasible by standard circuit board manufacture processes.

Secondly, the dielectric waveguide slab may be transparent (or at least approximately transparent) to the transmitted signal or wave of the antenna array of the DUT because of its thickness, which may, for example, be less than a half of a free-space wavelength, and the lack of continuous metallic traces on or in the dielectric waveguide slab.

Thirdly, the dielectric waveguide slab may be also used as a waveguide in order to carry or guide signals from the on-slab-circuits, e. g. through the waveguide transitions to the radio frequency components located, for example, at the dielectric waveguide slab edges. The transmission of a guided signal or wave has much lower transmission loss than the transmission of a radiated signal or wave, as a radiation spreads in every direction of a three-dimensional space, whereas the guided signal or wave propagates within the plane of the dielectric waveguide slab.

Accordingly, this embodiment of the disclosure may allow for a sufficiently accurate characterization of an antenna of the plurality antennas of a DUT, while being robust and cost efficient and therefore well-usable in a test environment.

In an embodiment, the measurement arrangement comprises a signal evaluation circuitry, which is coupled to the radio frequency components and which is configured to characterize the radio frequency arrangement by evaluating the radio signals received by the radio frequency components. The radio signals received by the radio frequency components are based on radio signals transmitted by the antennas and frequency converted by the frequency-converting coupling between the antennas and the radio frequency component. Having a dedicated signal evaluation circuitry speeds up the evaluation of the radio signals received by the radio frequency components.

According to a further embodiment, the signal evaluation circuitry is configured to locate by a triangulation an antenna that is transmitting. That is, the transmitting antenna is, for example, located based on amplitude and phase information of the radio signals received at the radio frequency components. The signal evaluation circuitry is, for example, using a triangulation based on amplitude and phase information in order to reduce the number of radio frequency components, as opposed to the above-discussed conventional measurement arrangements, in which the number of radio frequency components is scaling linearly with the number of antennas of the DUT, that is, each radiator is measured by at least one radio frequency component. The triangulation may, for example, locate a frequency converting structure which is excited by an antenna or by the corresponding antenna of the DUT and may therefore conclude to a location of the DUT antenna.

In an embodiment, the measurement arrangement comprises a signal evaluation circuitry, which is coupled to the antennas of the DUT and which is configured to characterize the radio frequency arrangement by evaluating radio signals received by the antennas. The radio signals received by the antennas are based on radio signals transmitted by the radio frequency components and frequency converted by the frequency-converting coupling between the antennas and the radio frequency components, e.g., by the frequency converting structures. Having a dedicated signal evaluation circuitry speeds up the evaluation of the radio signals received by the antennas. Also, it is possible to make a measurement in both directions, and test both transmit and receive directions of the antenna of the DUT.

According to a further embodiment, the radio frequency components are configured to transmit radio signals with different frequencies, e.g., simultaneously. Transmitting signals at different predefined frequencies allows identifying or differentiating the radio signals of different radio frequency components, for example, in the case of the radio signals that are transmitted simultaneously. Also, by simultaneously transmitting radio signals with different frequencies, a frequency conversion (mixing) can be performed in the frequency converting structure, such that a frequency of a radio signal re-radiated by the frequency-converting structures can be adjusted flexibly.

In an embodiment, the radio frequency components are configured to simultaneously transmit radio signals at two different frequencies. The transmitted radio signals are mixed by the frequency converting structures. The measurement arrangement is configured to evaluate a mixed signal, obtained on the basis of the simultaneously transmitted radio signals, in order to characterize the radio frequency arrangement. Accordingly, the mixed signal can be distinguished from the (strong) radio signal transmitted by the radio frequency components and is radiated from the localized frequency converting structure. For example, there is no need to transmit radio signals by each and every radio frequency components simultaneously and identifying their transmitted radio signals with different frequencies. Transmitting simultaneously only two radio signals at different frequencies is sufficient. The amplitude and the phase of the radio signal depend on the distance from the transmitting radio frequency component. Thus, every frequency converting structure mixes radio signals with different amplitude and phase. The measurement arrangement evaluates the mixed signals in order to characterize the radio frequency arrangement.

In an embodiment, the radio frequency components are configured to simultaneously transmit radio signals at two or more different frequencies. The measurement arrangement is configured to simultaneously test separate branches of the radio frequency arrangement, e.g., separate antennas and/or separate radio frequency front-ends connected with the antennas, using different radio signals of the different frequencies. For example, testing one or more branches using a radio signal of a first frequency and testing one or more other branches using a radio signal of the second frequency accelerates a test. Thus, radio frequency arrangements with more than one branches, which are configured to operate at different frequencies, can be tested as well.

According to a further embodiment, the dielectric waveguide slab has a thickness of less than a half of a free-space wavelength of the radio signal, or of the frequency of the radio signal, transmitted by one or more of the antennas or by one or more of the radio frequency components. The thickness of the dielectric waveguide slab is small relative to the wavelength of the radio signal. Thus, the dielectric waveguide slab is, for example, at least approximately transparent to the radio signal. The radio signal suffers only a small transmission loss, and degradations of the antenna characteristics may be small.

In an embodiment, the dielectric waveguide slab comprises one or more layers. Single and/or many-layer structures are simple structures and can be produced cost effectively by standard circuit board manufacture processes.

According to a further embodiment, the one or more layers of the dielectric waveguide slab are made of silicon and/or quartz and/or polymer and/or ceramics. Silicon and/or quartz and/or polymer and/or ceramics are commonly used dielectric materials in a standard circuit board manufacture process. By choosing standard materials, the complexity and the cost of production is low.

According to a further embodiment, the plurality of frequency converting structures are arranged in a reactive near field, e.g., within less than a half of a free-space wavelength of the radio signal transmitted or received by a respective associated antenna, of a respective associated antenna of the plurality of antennas. Placing frequency converting structures in the reactive near field of the associated antennas allows to measure or characterize the single antenna elements separately, minimizing disturbances caused by or interferences with other antennas of the same plurality of antennas.

In an embodiment, the frequency converting structures respectively comprise an antenna structure, a mode coupler, e.g., a mode launcher, and one or more non-linear element, such as diodes. The antenna structure is configured to couple with a field of a respective associated antenna of the plurality of antennas. The mode coupler is configured to couple the frequency converting structure with the dielectric slab, for example, by exciting a mode in the dielectric slab, or by coupling to a mode in the dielectric slab. The one or more non-linear elements are coupled with the antenna structure and with the mode coupler. The one or more non-linear elements are configured to perform a frequency conversion, for example, such that a frequency of a radio signal received via the mode coupler is different from a frequency of a radio signal transmitted via the antenna structure, or such that a frequency of a radio signal received via the antenna structure is different from a frequency of a radio signal transmitted via the mode coupler. In other words, the frequency converting structure couples an associated antenna element of the plurality of antennas of the DUT with the dielectric waveguide slab and converts the frequency of the radio signal with the help of one or more non-linear elements, which allows for a good localization of an origin of the frequency converted signal.

According to a further embodiment, the antenna structure of a frequency converting structure is smaller than an associated antenna of the plurality of antennas. For example, a maximum extension of the antenna structure of the frequency converting structure is smaller, at least by a factor of 2 or at least by a factor of 5 or at least by a factor of 10, than a maximum extension of the associated antenna, or an area of the antenna structure of the frequency converting structure is smaller, at least by a factor of 2 or at least by a factor of 5 or at least by a factor of 10, than an area of the associated antenna. As the maximum extension and/or the area of the antenna structure of a frequency converting structure is smaller than the maximum extension and/or the area of the associated antenna, the antenna structure receives only a small fraction of the radio signal transmitted by the associated antenna, while the associated antenna receives the radio signal transmitted by the antenna structure. Moreover, the small antenna structure of the frequency converting structure does not significantly distort a field radiated by an antenna of the DUT.

In an embodiment, the antenna structure of the frequency converting structure or the frequency converting structure is arranged in an environment of a radiating edge of the associated patch-type antenna of the plurality of antennas, for example in a proximity of a radiating edge of the associated patch-type antenna. Positioning the antenna structure of the frequency converting structure or the frequency converting structure itself at a radiating edge of an associated patch-type antenna results in a stronger received radio signal at the frequency converting structure.

According to further embodiments, the one or more non-linear elements, such as diodes, of the frequency converting structure are made of silicon and/or gallium arsenide. Silicon and/or gallium arsenide are commonly used materials for non-linear elements. Using commonly used, standard materials lowers complexity and costs while improving the manufacturability of the non-linear element of the frequency converting structure of the dielectric waveguide slab and the manufacturability of the measurement arrangement itself.

According to further embodiments, the one or more non-linear elements of the frequency converting structure comprise a Schottky-diode. Schottky-diodes have typically a low forward voltage drop and a very fast switching action. The high switching speed and the low threshold voltage of the Schottky-diode makes it a good fit for the frequency converting structure designed for radio signals in the mm-wavelength range.

According to further embodiments, the one or more non-linear elements of the frequency converting structure comprise a photodiode configured to bias the frequency converting structure when illuminated. A photodiode in the frequency converting structure allows to further influence the frequency converted signal by simply illuminating the photodiode. A conversion efficiency of the frequency converting structure can be improved by (wirelessly) providing a bias using the photodiode. Moreover, the usage of a photodiode even allows to wirelessly activate or deactivate a frequency converting structure, by controlling an illumination of the photodiode.

In an embodiment, the photodiode is configured to reduce, or even minimize, a conversion loss of the frequency converting structure when illuminated. Minimizing, or reducing the converter loss results in a stronger received radio signal.

According to a further embodiment, the photodiode is configured to selectively activate the frequency converting structure when illuminated. Using the photodiode as a switch, allows to characterize the antenna elements of the plurality of antennas one by one without one measurement influencing the another. Also, the selective activation of the frequency converting structure can be performed wirelessly, and not in combination with electric control metal wires, which helps to avoid distortions of a radiated field.

In an embodiment, the photodiode is configured to generate an alternating signal when illuminated with a modulated light, allowing all sorts of influence and/or modulation applied on the frequency-converted signal.

According to further embodiments, the measurement arrangement is configured to irradiate the photodiode with light that is modulated with a modulation frequency. Also, the frequency converting structure is configured such that a frequency difference between a frequency of an incoming radio signal, e.g., a radio signal obtained by the antenna structure, of the frequency converting structure and a frequency of an outgoing radio signal, e.g., a radio signal coupled into the dielectric waveguide slab, of the frequency converting structure is determined by the modulation frequency, such that the modulation frequency of the light determines the frequency conversion of the frequency converting structure. Accordingly, any kind of modulated signal can be achieved as an output of the frequency converting structure or as a frequency converted signal.

According to further embodiments, the measurement arrangement comprises one or more laser diodes or light emitting diodes configured to illuminate the photodiode of one or more corresponding frequency converting structures, e.g., with a quasi-constant light intensity, to provide a biasing and/or with a modulated light intensity, to effect a frequency conversion. Using commonly available light-emitting-diodes or laser diodes improves the manufacturability of the measurement arrangement and lowers the production costs. Moreover, effective control of a plurality of frequency converting structures is possible in this way.

According to further embodiments, a frequency of the radio signal and/or a frequency of the frequency converted radio signal is between 30 GHz and 300 GHz. Using mm-wave radio signals, or radio signals at a frequency between 30-300 GHz, the measurement arrangement is prepared for assumed future mobile communication devices.

According to further embodiments, the radio signal and/or the frequency-converted signal radio is a chirp signal. A chirp signal is configured to test all the frequencies within a given frequency range and therefore it is optimal in a test environment or in a measurement arrangement.

Further embodiments according to the present disclosure create respective methods and a respective automated test equipment comprising the measurement arrangement described above.

However, it should be noted that the methods and the automated test equipment are based on the same considerations as the corresponding measurement arrangement. Moreover, features, functionalities and details of the methods and/or the automated test equipment may be supplemented by any of the features or functionalities and details which are described herein with respect to the measurement arrangement, both individually and taken in combination.

This summary is provided to introduce a selection of principles of the disclosure in a simplified form that are further described below in the Detailed Description section. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments, together with the description, serve to explain the principles of the disclosure.

Embodiments of the present disclosure are set out below in the figures.

Embodiments according to the present application will subsequently be described taking reference to the enclosed figures.

Figure 1:
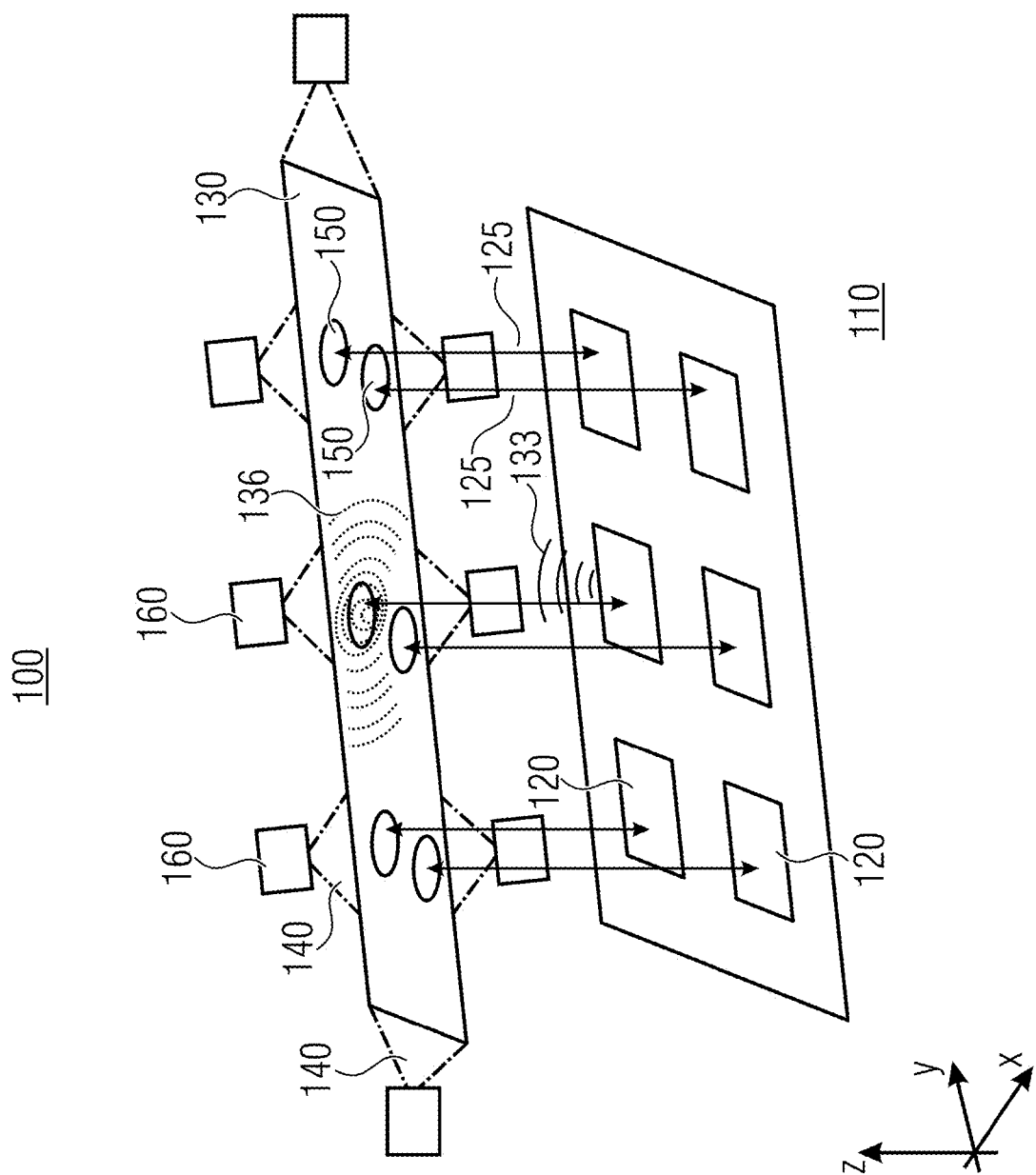

FIG. 1 shows a schematic representation of an embodiment of a measurement arrangement for characterizing a radio frequency arrangement comprising a plurality of antennas.

Figure 2:
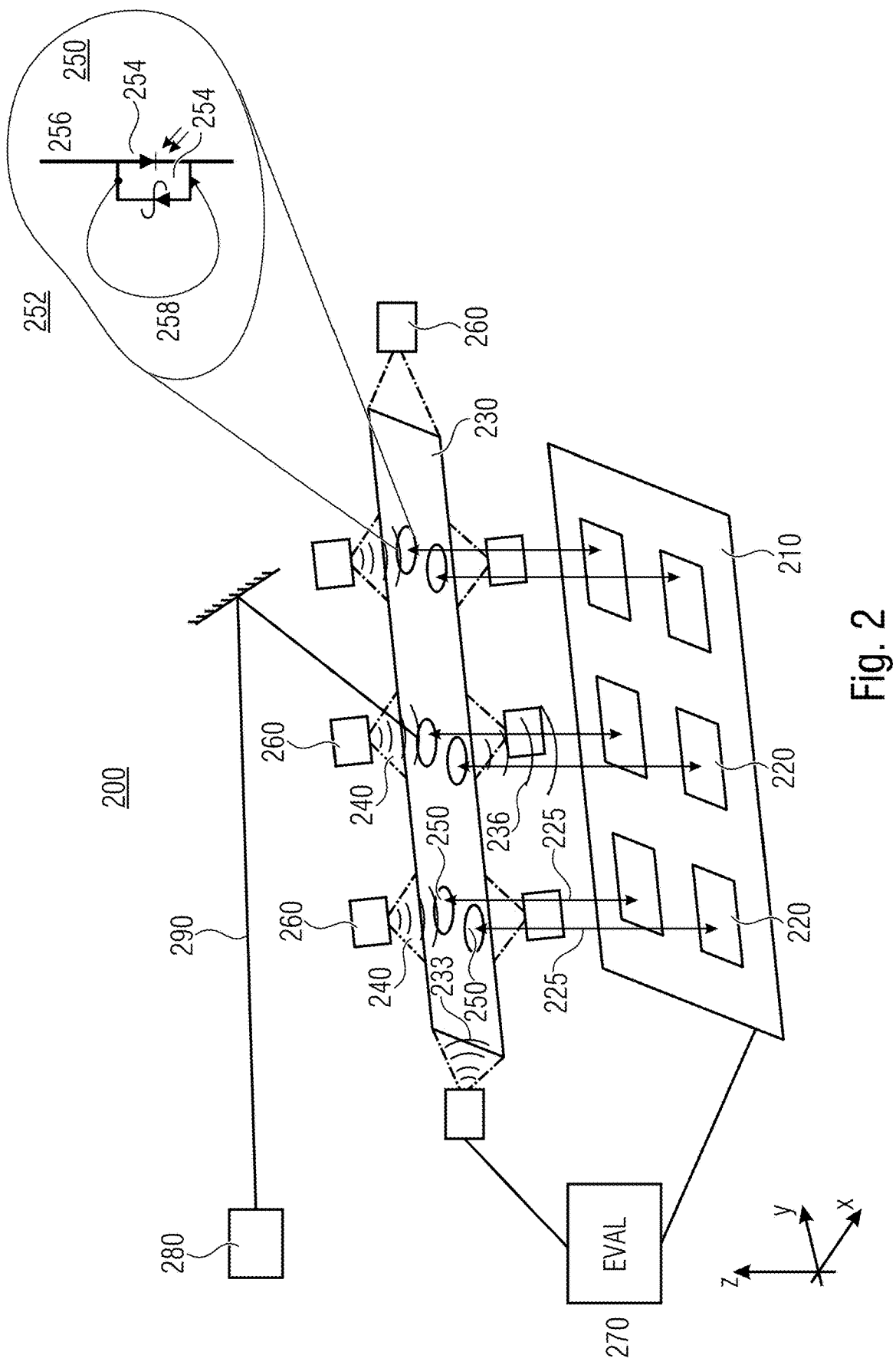

FIG. 2 shows a schematic representation of an another embodiment of a measurement arrangement for characterizing a radio frequency arrangement comprising a plurality of antennas.

Figure 3A:
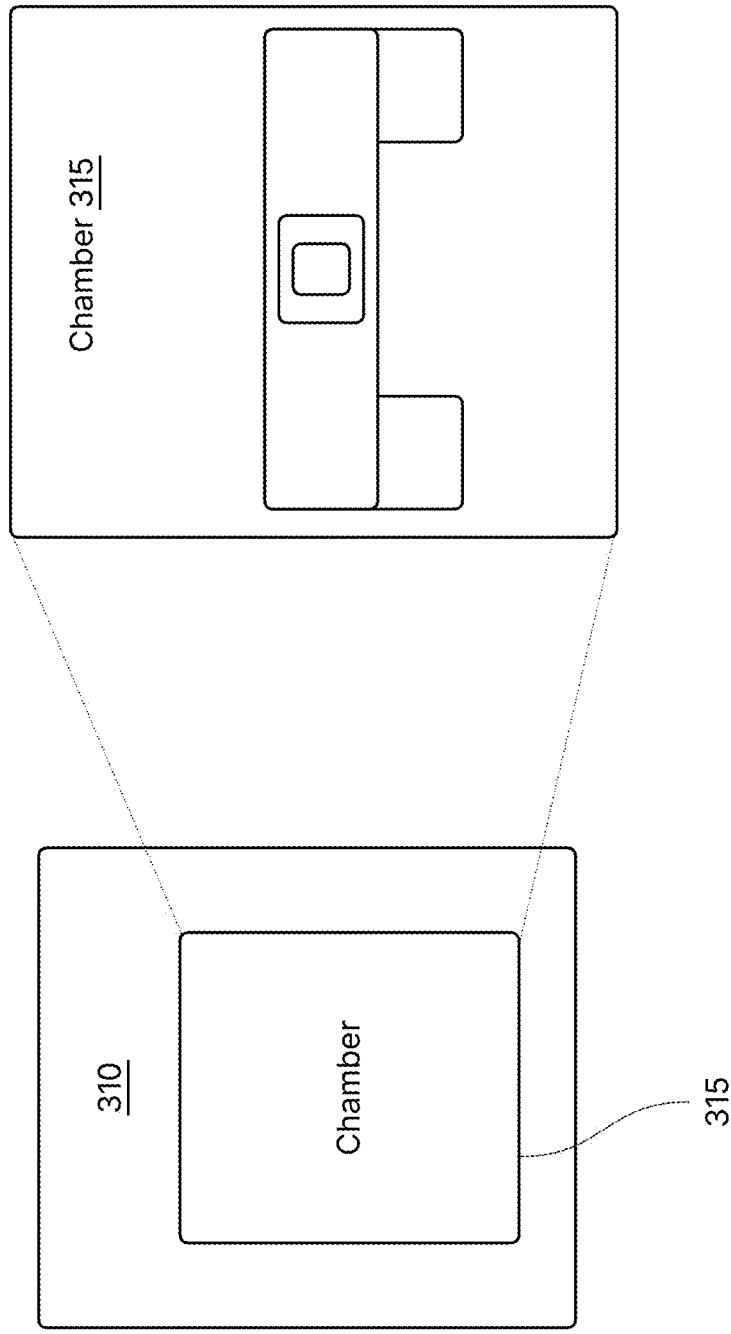

FIG. 3a shows pictures of a conventional far-field radiation pattern measurement setup.

Figure 3B:
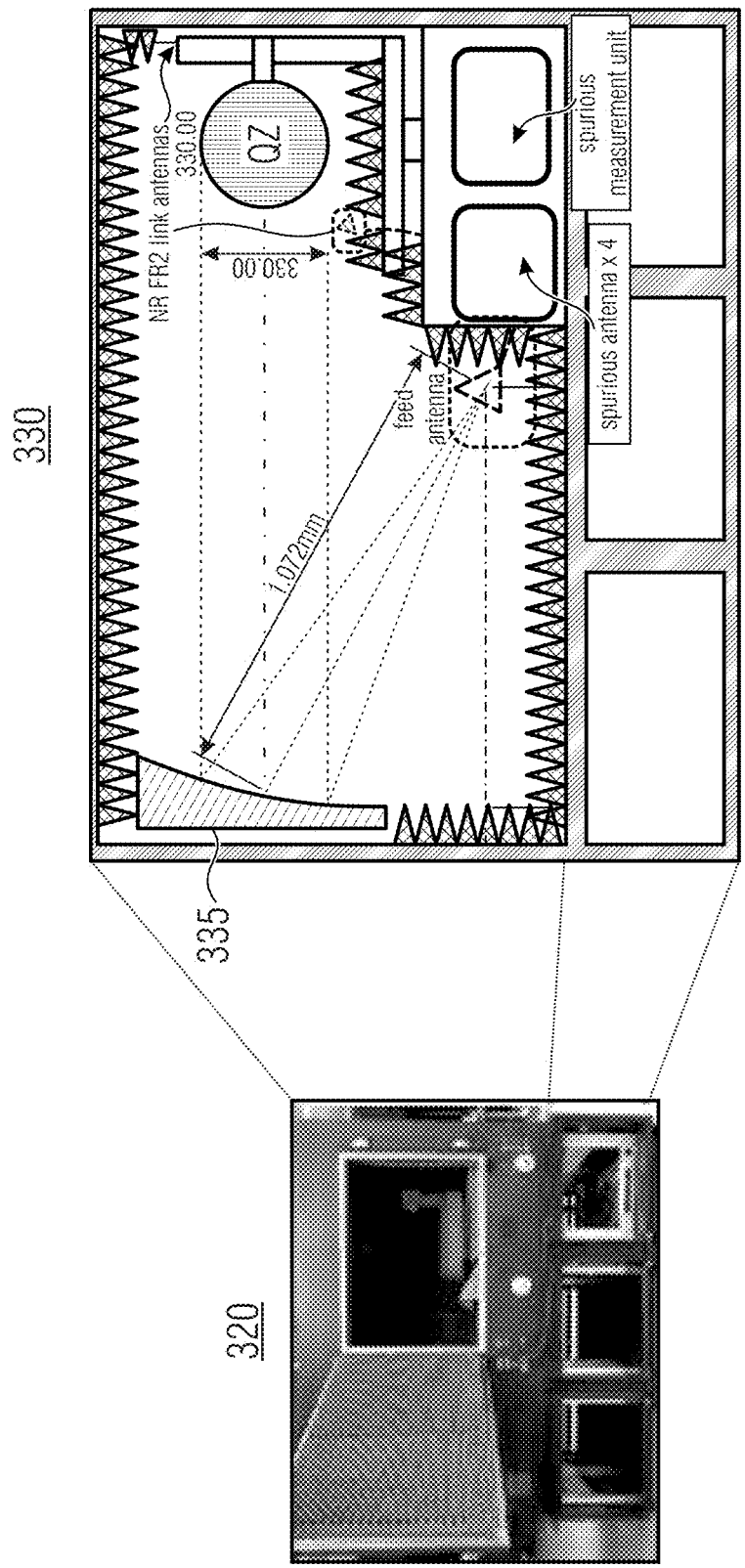

FIG. 3b shows a picture of a conventional compact-range radiation pattern measurement setup and its schematic representation.

Figure 4:
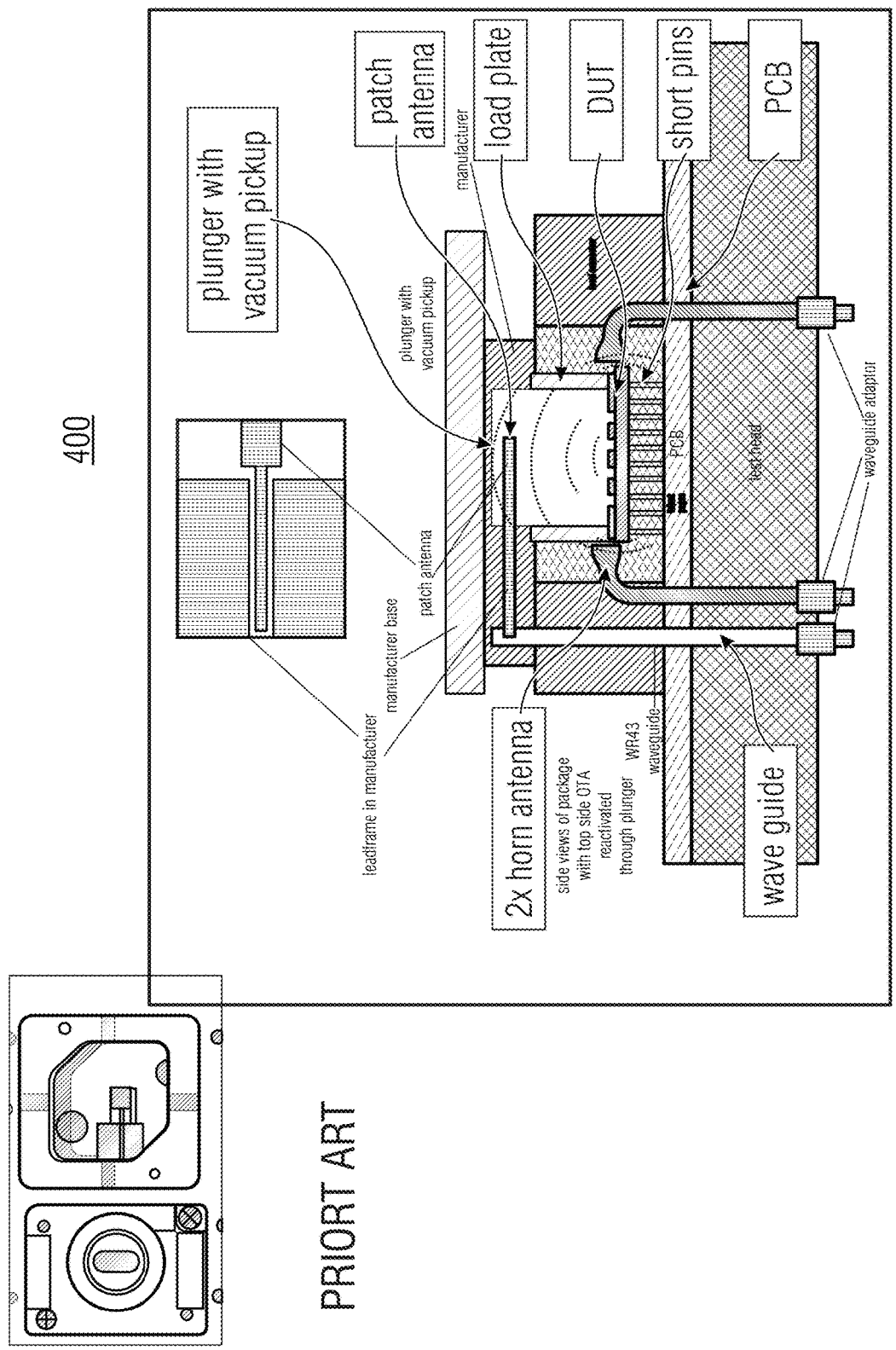

FIG. 4 shows a schematic representation of another conventional far-field measurement setup.

Figure 5:
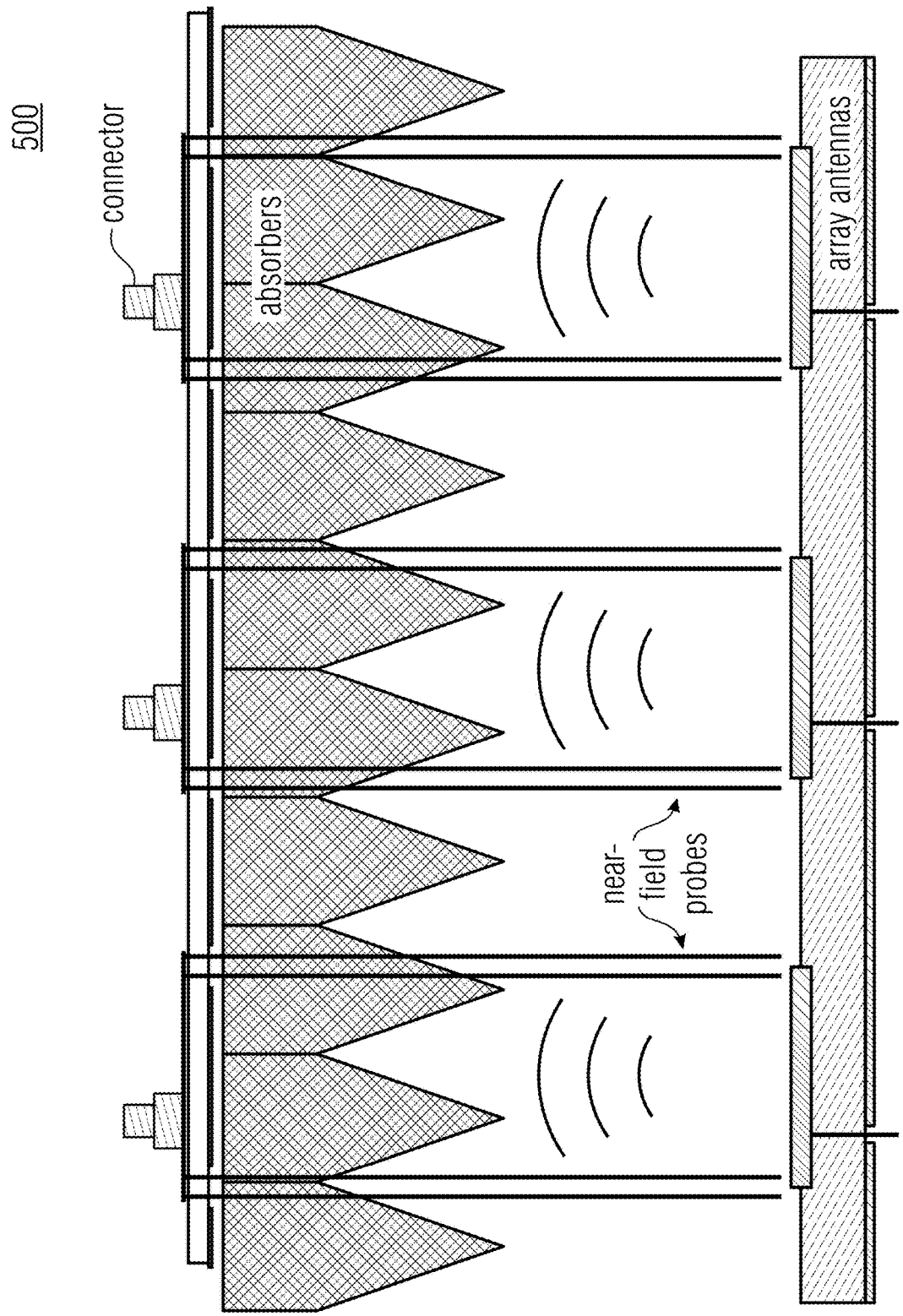

FIG. 5 shows a schematic representation of a conventional measurement approach to measure modules containing small arrays (4-8 elements) in the reactive near-field.

Figure 6:
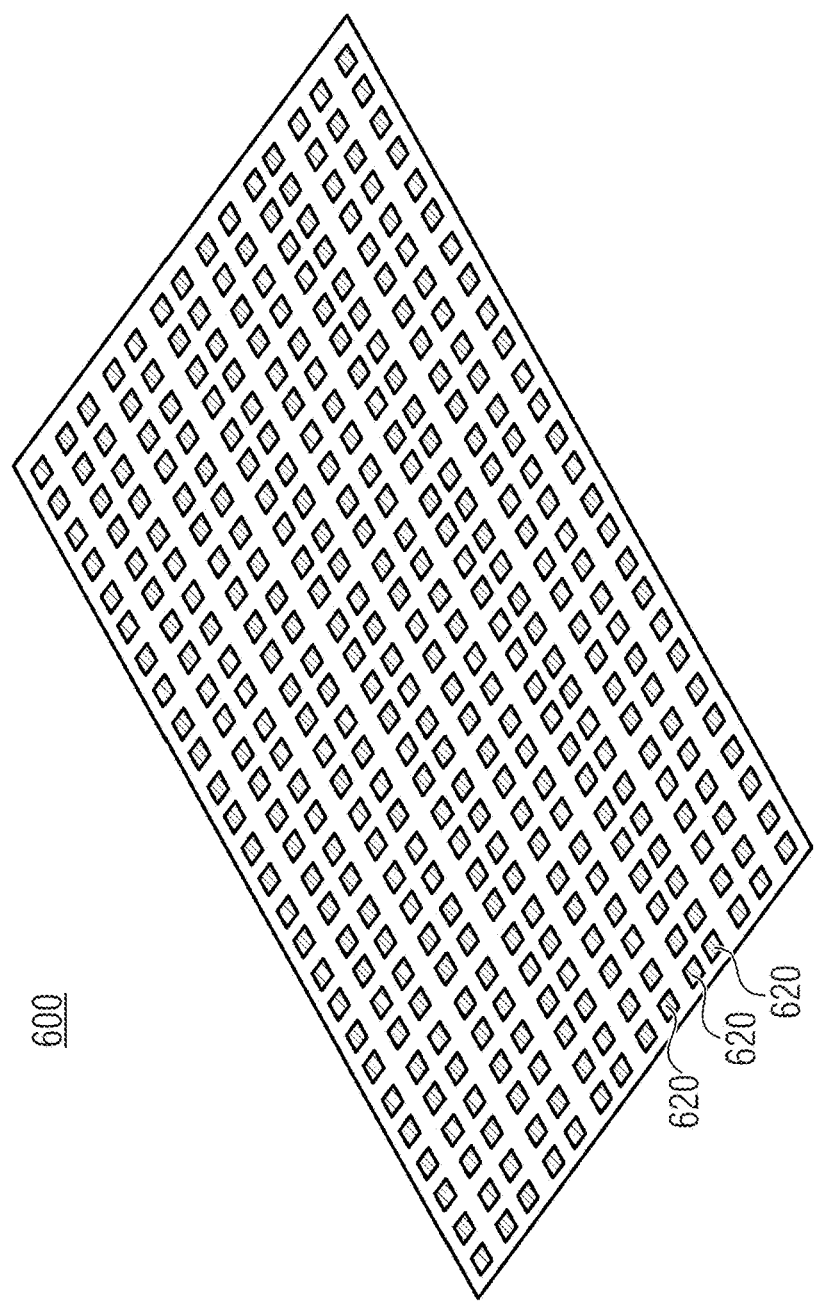

FIG. 6 shows a schematic representation of an exemplary radio frequency arrangement of an assumed future handheld device to be measured.

Figure 7:
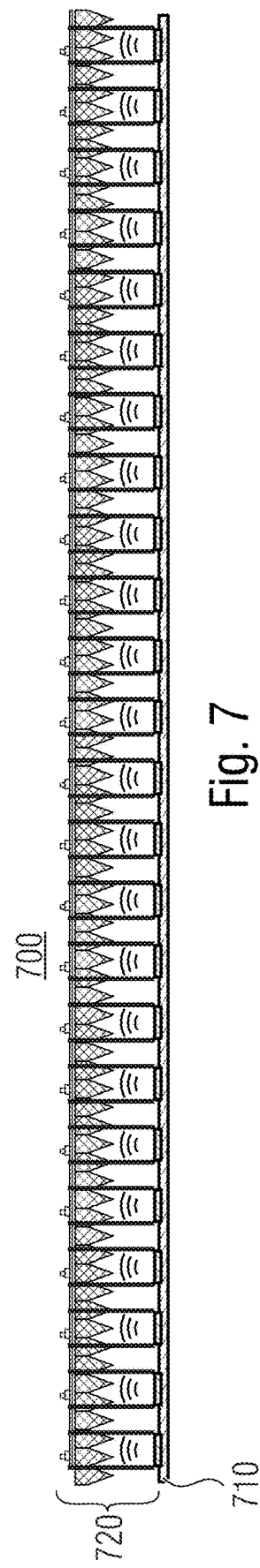

FIG. 7 shows a schematic representation of a hypothetical measurement arrangement for characterizing a radio frequency arrangement of an assumed future handheld device.

Figure 8A:
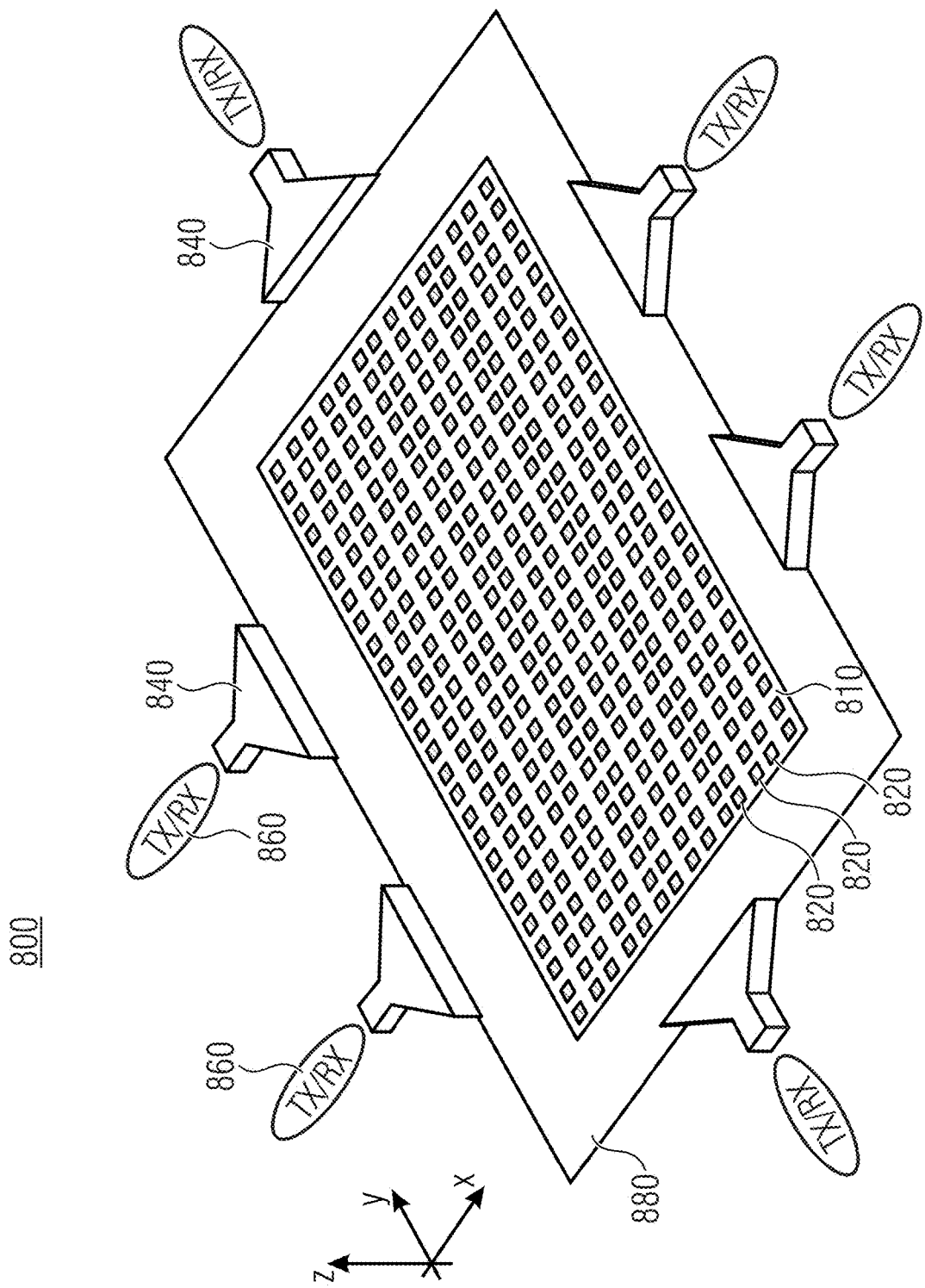

FIG. 8a shows a schematic representation of an another embodiment of a test arrangement.

Figure 8B:
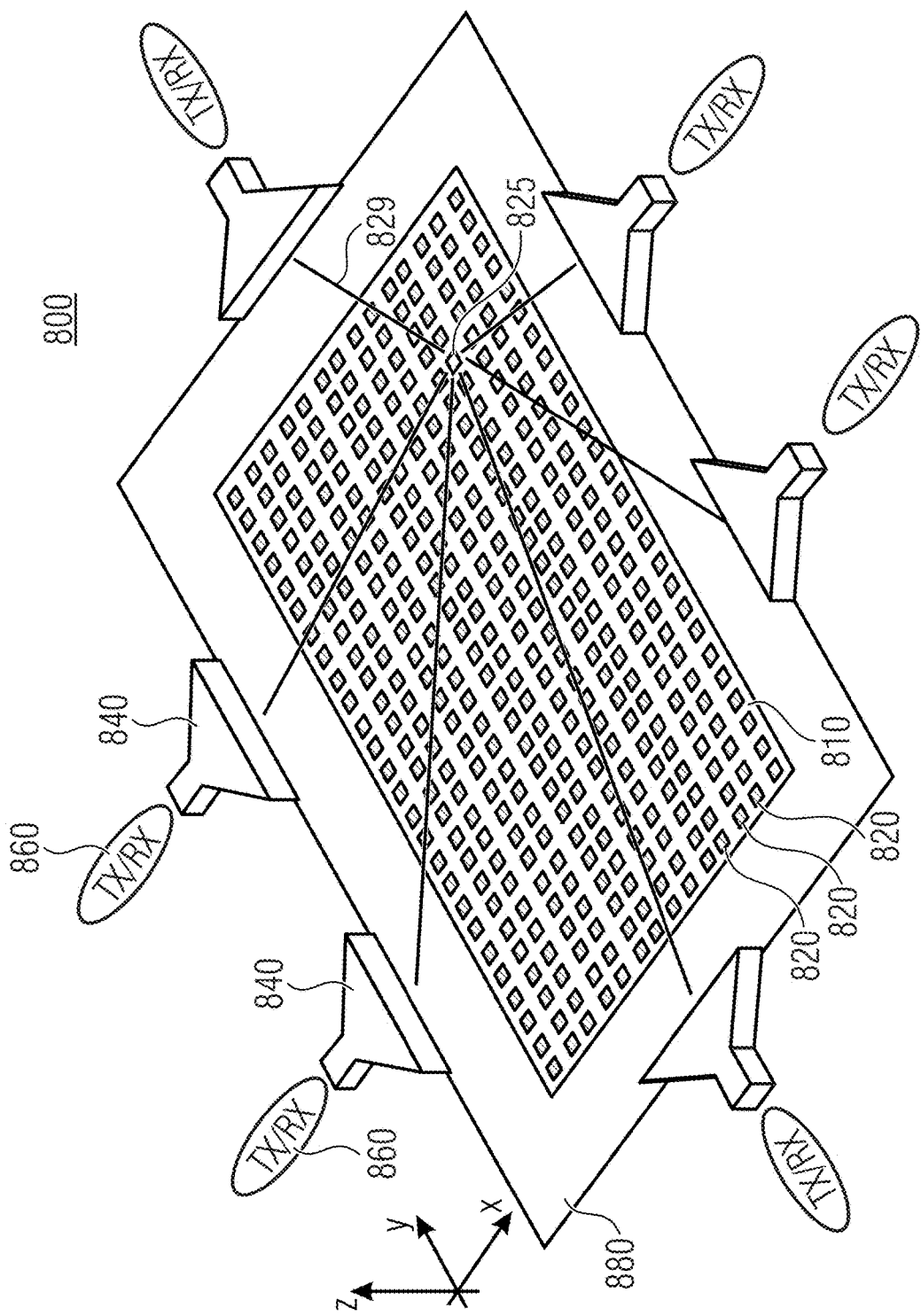

FIG. 8b shows a schematic representation of the embodiment of FIG. 8a, in which a single antenna of the antenna array transmits a radio signal, which is received by the transceivers or, a multitude of transceivers transmit radio signals coherently at the same time, which interfere constructively at the location of the highlighted single receive antenna in the antenna array.

Figure 9A:
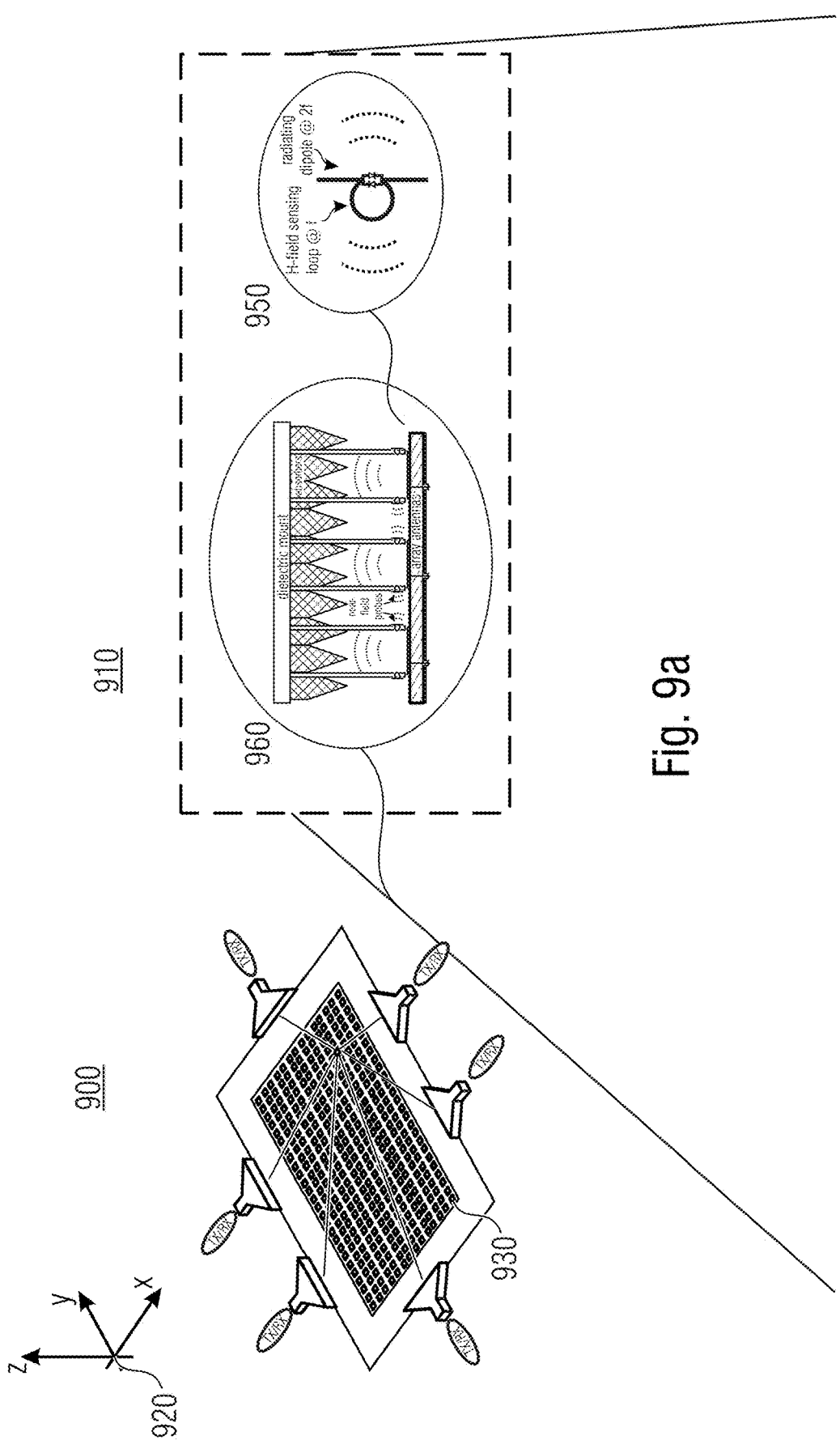

FIG. 9a shows a schematic representation of an another embodiment of a measurement arrangement for characterizing a radio frequency arrangement with converting structures and their mounts.

Figure 9B:
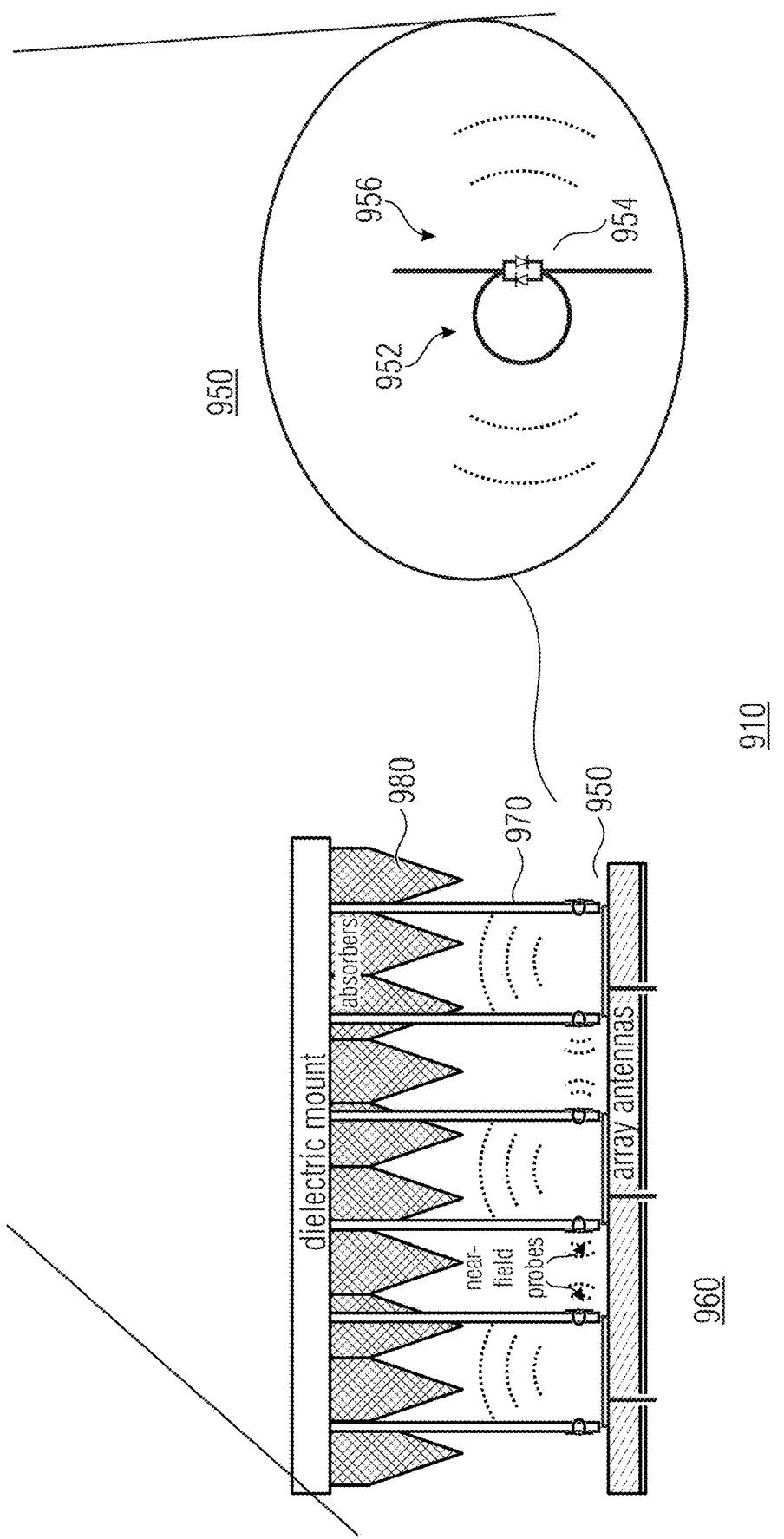

FIG. 9b shows a magnified schematic representation of the converting structures and their mounts of the embodiment of FIG. 9a.

Figure 10A:
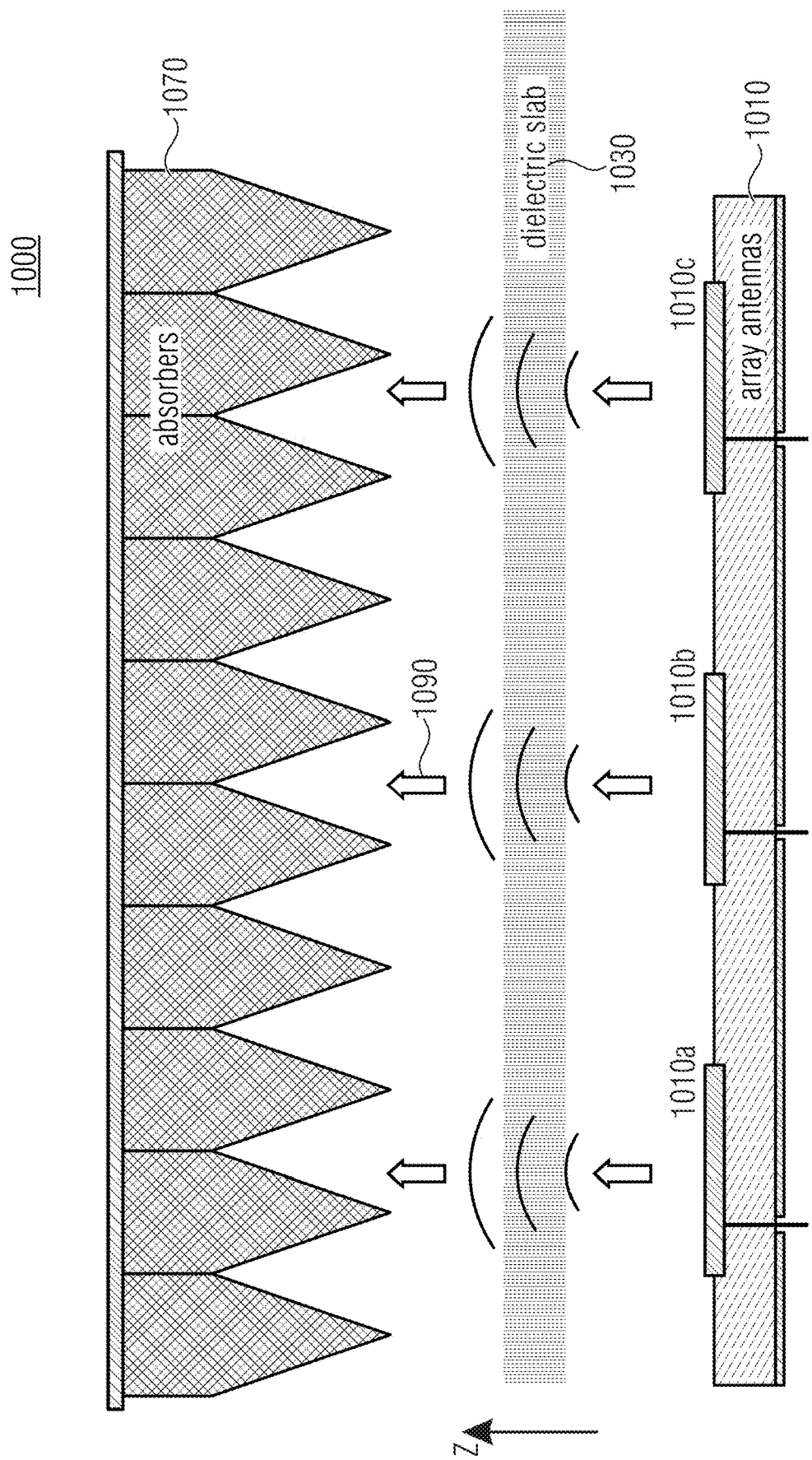

FIG. 10a shows a schematic representation of an measurement arrangement section with a dielectric waveguide slab.

Figure 10B:
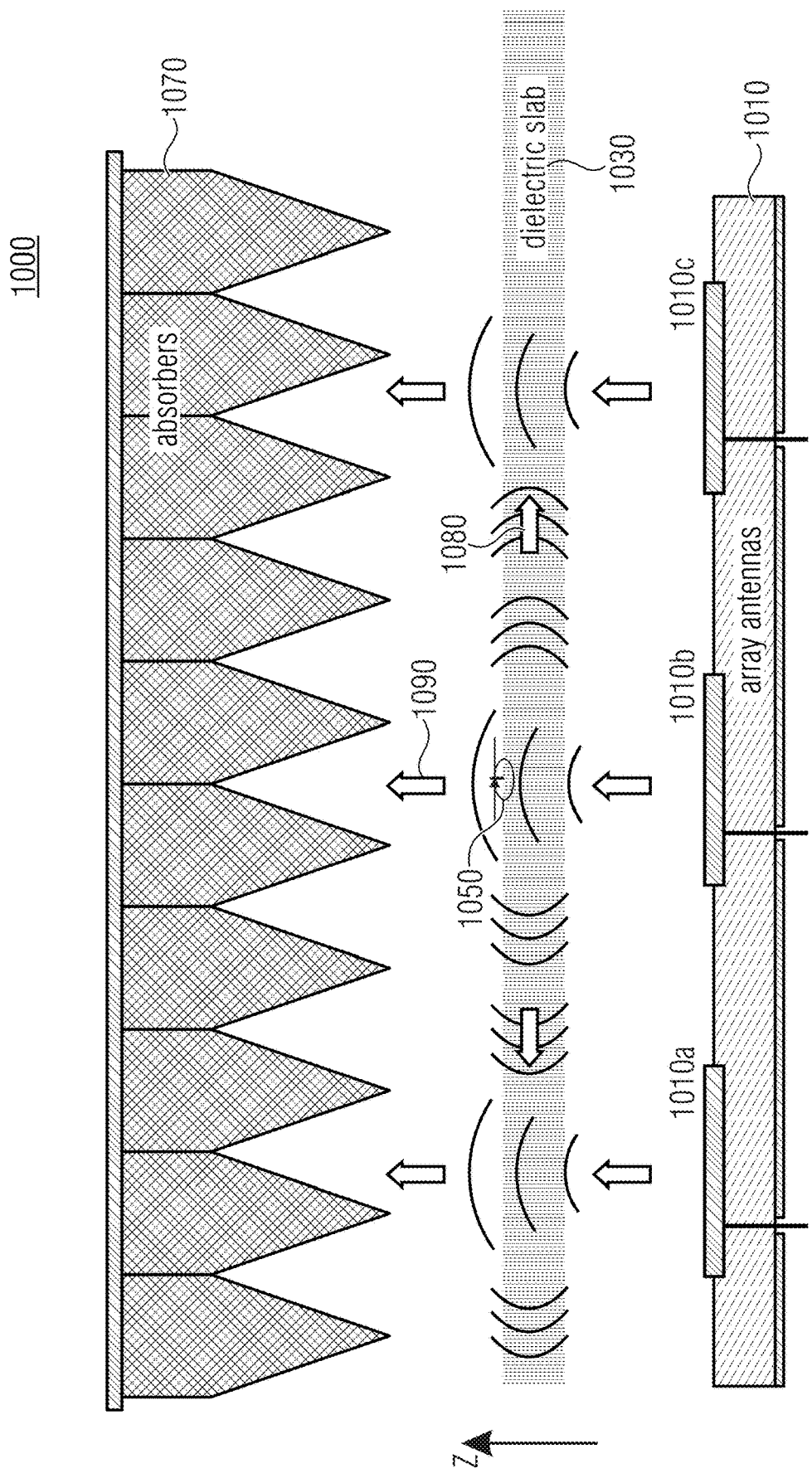

FIG. 10b show a schematic representation of an embodiment of a measurement arrangement section with a dielectric waveguide slab comprising frequency converting structures.

Figure 11:
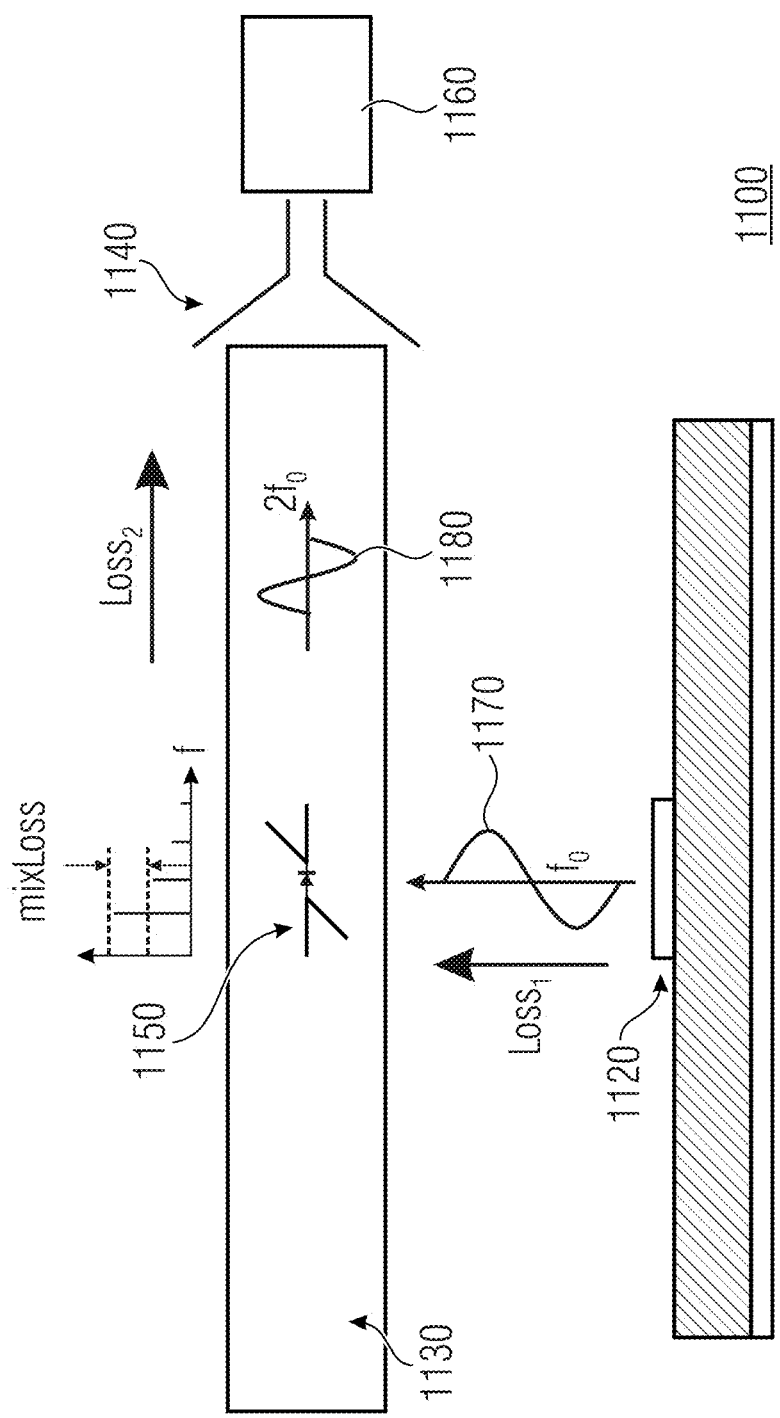

FIG. 11 shows a schematic representation of an embodiment of a measurement arrangement indicating losses that the radio signal suffers between the antenna and the radio frequency components.

Figure 12A:
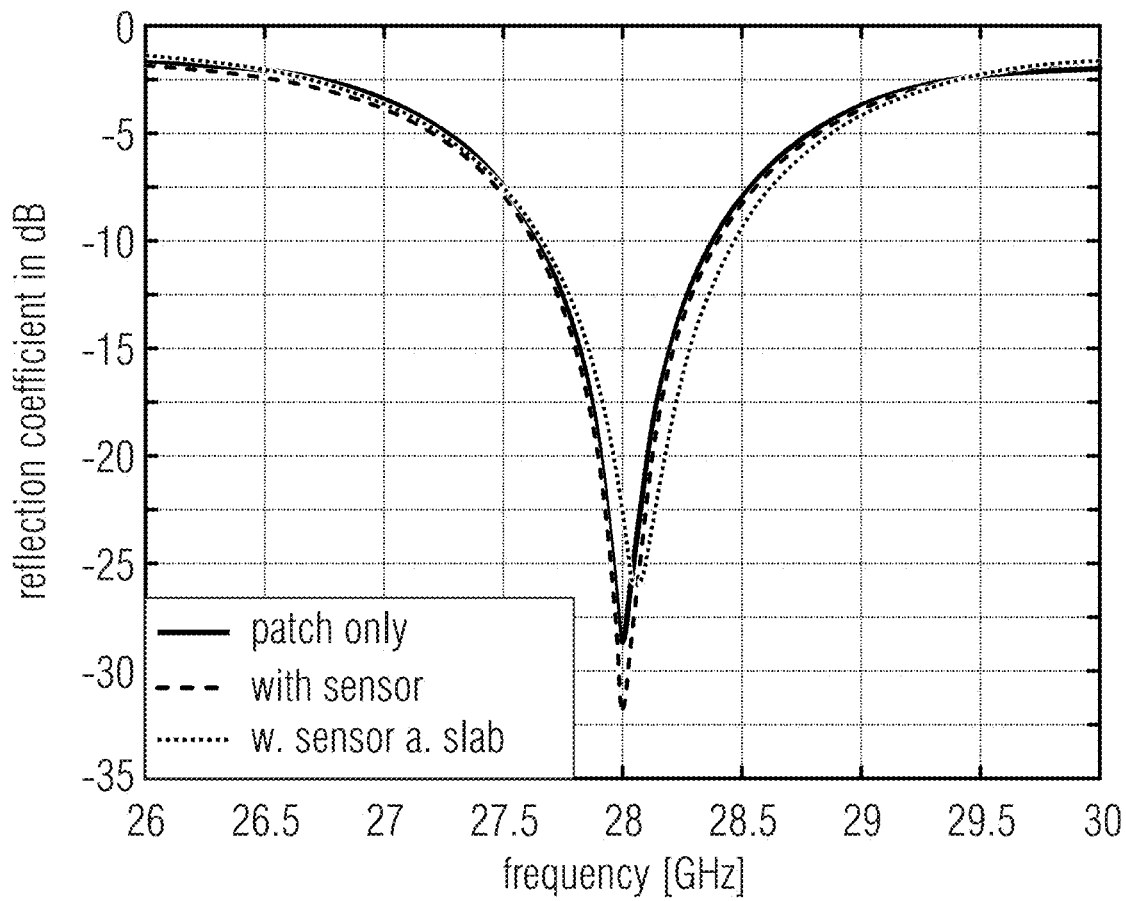

FIG. 12a shows a diagram comparing different measurement arrangements.

Figure 12B:
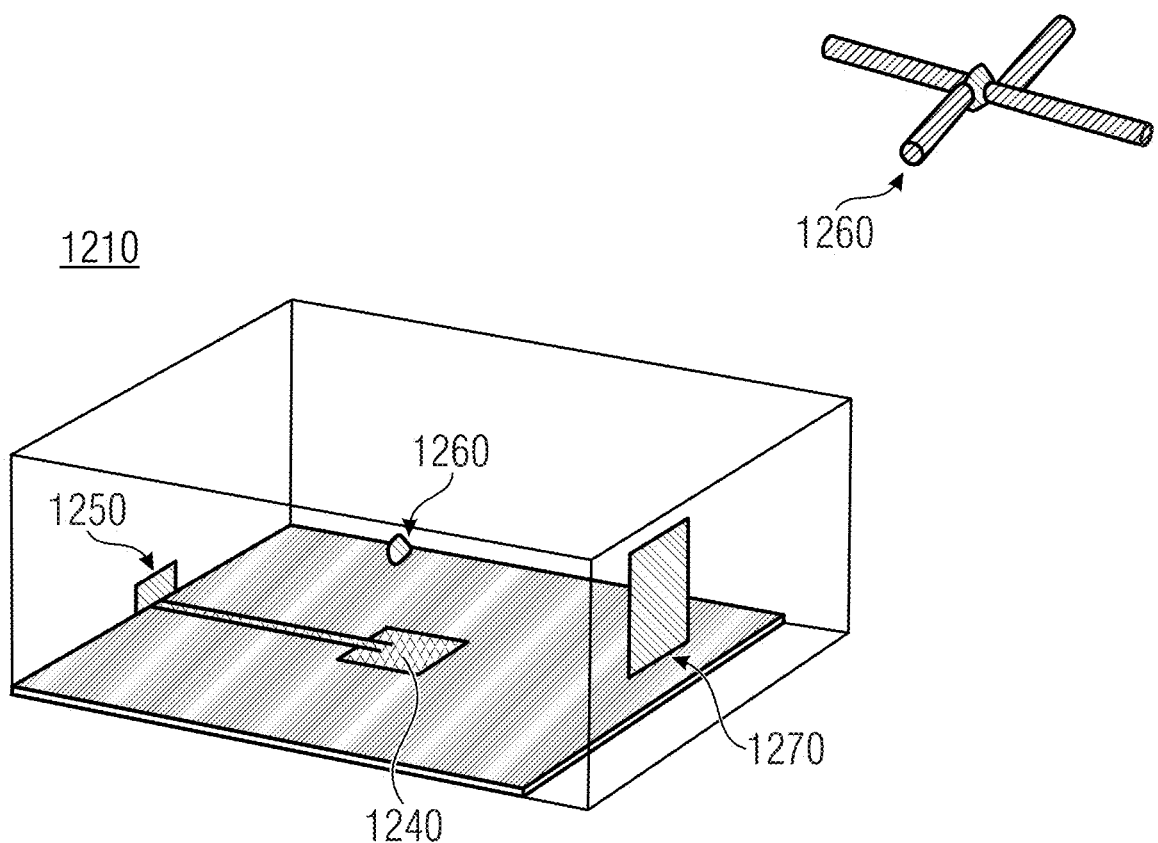

FIG. 12b shows a schematic representation of a measurement arrangements with a frequency converting structure.

Figure 12C:
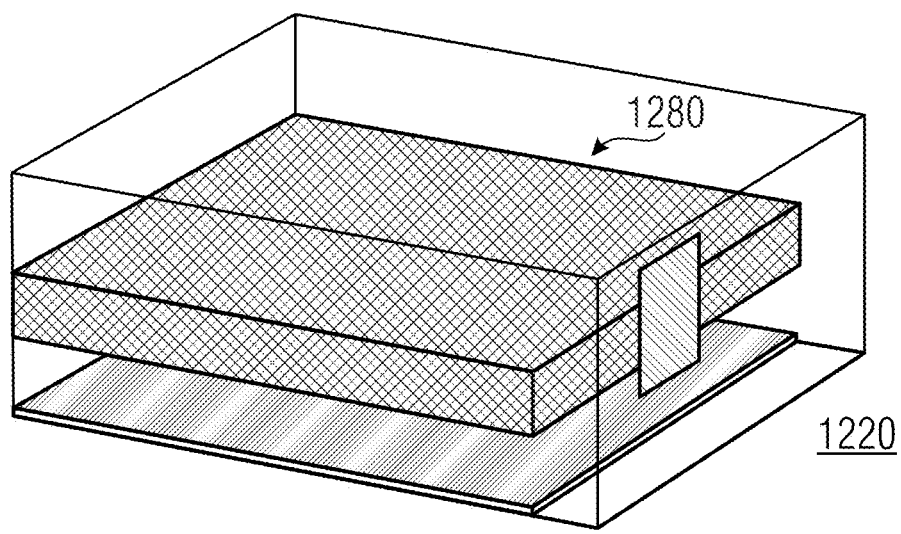

FIG. 12c shows a schematic representation of a measurement arrangements with a frequency converting structure in a dielectric waveguide slab.

FIG. 13a shows a diagram comparing the transmissions from patch antenna to the frequency converting structure with a dielectric waveguide slab and without a dielectric waveguide slab.

FIG. 13b shows a schematic representation of a portion of the measurement arrangement with a slab with an antenna transmitting a radio signal in the direction of the frequency converting structure.

Figure 14A:
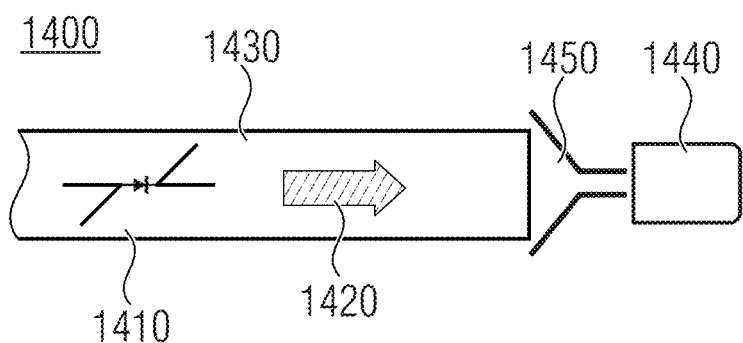

FIG. 14a shows a schematic representation of a portion of an embodiment of a measurement arrangement comprising a frequency converting structure transmitting a frequency-converted signal, which is guided through a dielectric waveguide slab to a radio frequency component through a waveguide transition.

Figure 14B:
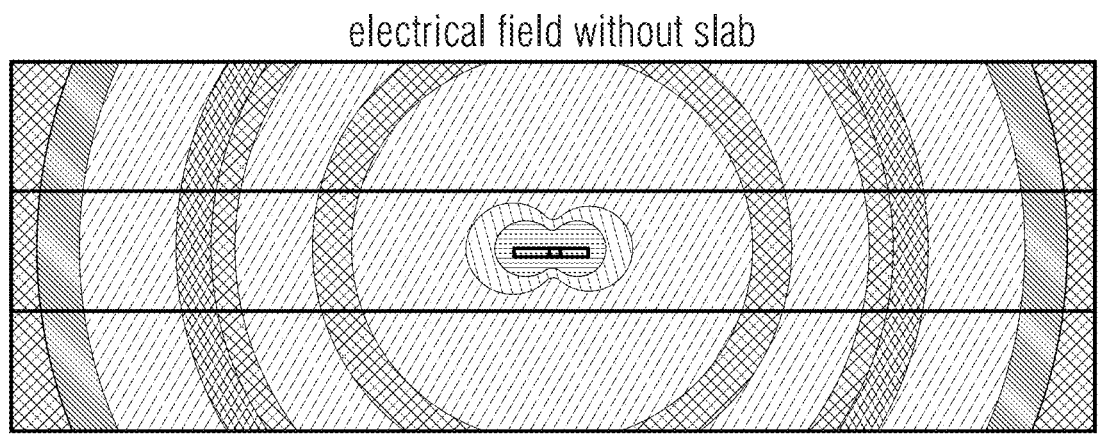

FIG. 14b shows simulated electrical field of a signal transmitted by the frequency-converted structure to the radio frequency component in a measurement arrangement without a dielectric waveguide slab.

Figure 14C:
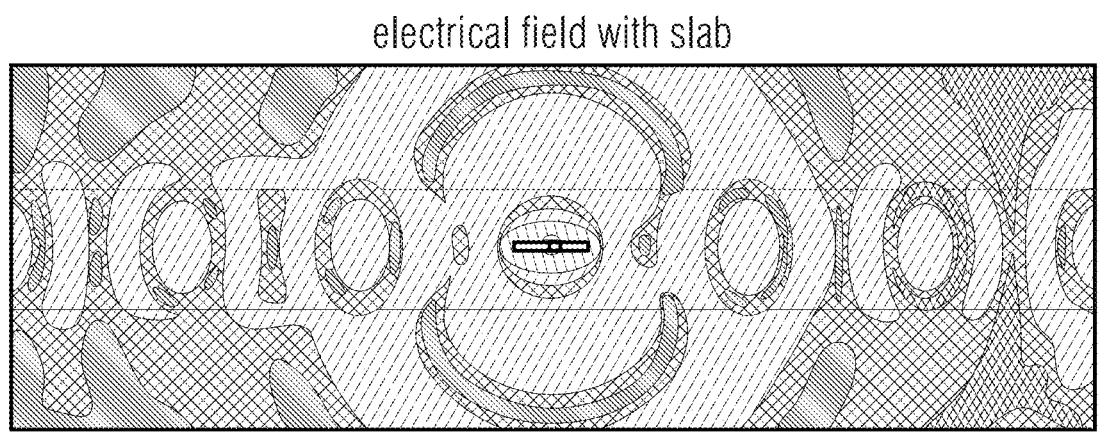

FIG. 14c shows simulated electrical field of a signal transmitted by the frequency-converted structure to the radio frequency component in a measurement arrangement with a dielectric waveguide slab.

Figure 14D:
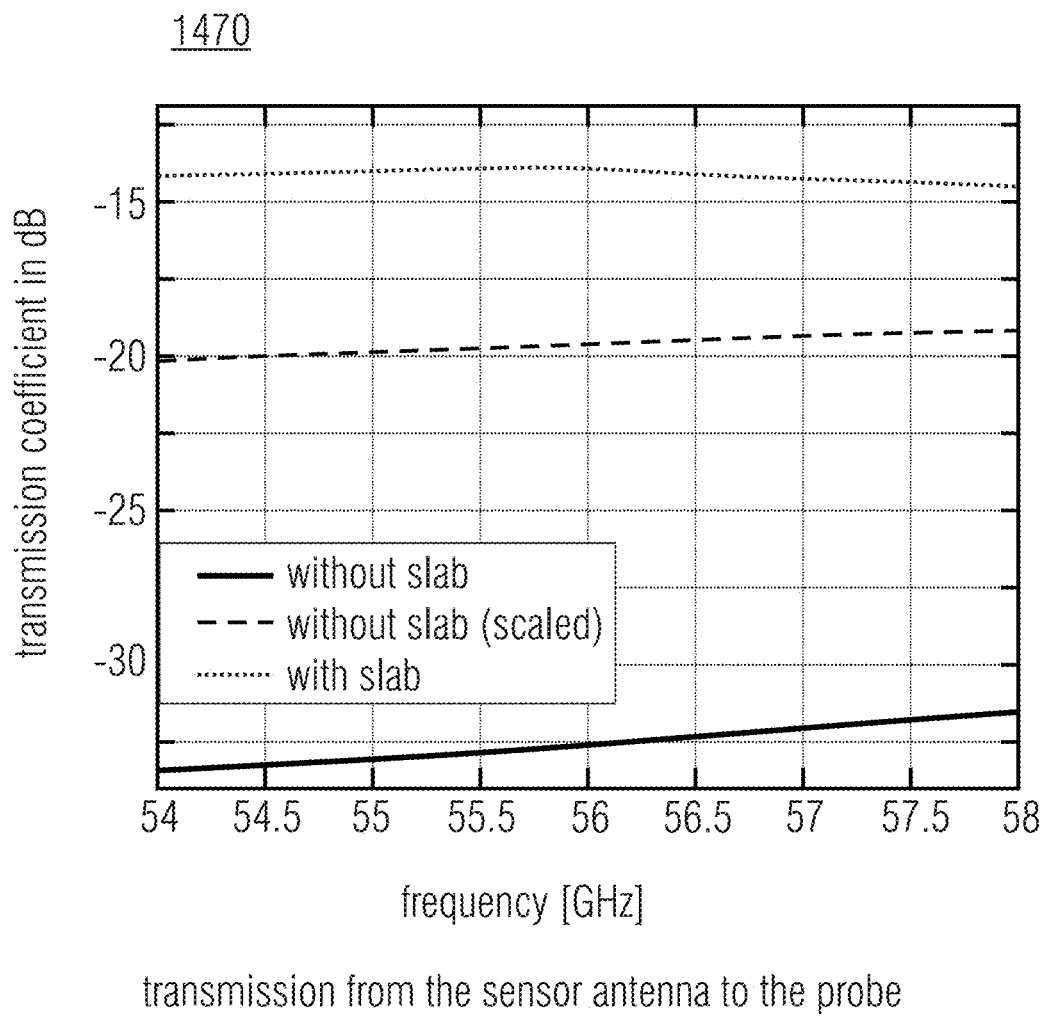

FIG. 14d shows a diagram comparing the transmission coefficients curves of measurement arrangements with and without a dielectric waveguide slab and also a scaled version of the transmission curve of the measurement arrangement without a dielectric waveguide slab.

DETAILED DESCRIPTION

Reference will now be made in detail to embodiments, examples of which are illustrated in the accompanying drawings. While the disclosure will be described in conjunction with these embodiments, it should be understood that they are not intended to limit the disclosure to these embodiments. On the contrary, the disclosure is intended to cover alternatives, modifications, and equivalents, which may be included within the spirit and scope of the disclosure as defined by the appended claims. Furthermore, in the following detailed description, numerous specific details are set forth in order to provide a thorough understanding. However, it will be recognized by one of ordinary skill in the art that embodiments may be practiced without these specific details.

In the following, different inventive embodiments and aspects will be described. Also, further embodiments will be defined by the enclosed claims.

It should be noted that any embodiments as defined by the claims may be supplemented by any of the details, features and functionalities described herein. Also, the embodiments described herein may be used individually and may also optionally be supplemented by any of the details, features and functionalities included in this claim.

Also, it should be noted that the individual aspects described herein may be used individually or in combination. Thus, details may be added to each of said individual aspect without adding details to another one of said aspects. It should also be noted that the present disclosure describes, explicitly or implicitly, features usable in a measurement arrangement or in an automatic test equipment (ATE). Thus, any of the features described herein may be used in the context of a measurement arrangement or in the context of an automatic test equipment.

Moreover, features and functionalities disclosed herein, relating to a method, may also be used in an apparatus configured to perform such functionality. Furthermore, any features, functionalities disclosed herein with respect to an apparatus may also be used in a corresponding method. In other words, any features, functionalities of the method disclosed herein may be supplemented by any of the features and functionalities described with respect to the apparatuses.

The present disclosure will be understood more fully from the detailed description below and from the accompanying drawings of embodiments of the present disclosure which, however, should not be taken to limit the present disclosure to the specific embodiments described, but are for explanation and understanding only.

FIG. 1 shows a schematic representation of an embodiment of a measurement arrangement 100 for characterizing a radio frequency arrangement 110 comprising a plurality of antennas 120.

The measurement arrangement comprises a dielectric waveguide slab 130 with a plurality of frequency converting structures 150 arranged in or on the dielectric waveguide slab 130.

The measurement arrangement further comprises a plurality of waveguide transitions 140 arranged at different positions, for example, along a circumference, of the waveguide slab 130 and coupled to respective radio frequency components 160. The radio frequency components 160 are configured to transmit and/or receive radio signals 133, 136.

The frequency converting structures 150 of the dielectric waveguide slab 130 are associated with respective antennas of the plurality of antennas 120. These association are represented by arrows 125 of FIG. 1.

The frequency converting structures 150 are configured to perform a frequency conversion on radio signals received 133, resulting in frequency-converted signals 136. The frequency converting structures 150 are further configured to couple respective antennas 120 with the dielectric waveguide slab 130 in a frequency-converting manner to establish a frequency-converting coupling between the antennas 120 and the plurality of waveguide transitions 140 to cause a frequency-converting coupling between the antennas 120 and the radio frequency components 160.

So the measurement arrangement 100 is configured to use the frequency-converting coupling between the antennas 120 and the radio frequency components 160 for characterizing the radio frequency arrangement 110, comprising, for example, antennas 120 and/or the radio frequency front-ends connected to the antennas 120.

Radio signals 133 transmitted by the antennas 120 are received and frequency-converted by frequency converting structures 150. The frequency-converted radio signals 136 are re-radiated into the dielectric waveguide slab 130. The dielectric waveguide slab 130 guides the frequency-converted radio signals 136 from the frequency converting structures 150 to the radio frequency components 160 through waveguide transitions 140. The measurement arrangement 100 characterizes the radio frequency arrangement 110 by evaluating the frequency-converted radio signals 136 received by the radio frequency components 160.

Another option for characterizing the radio frequency arrangement 110 by the measurement arrangement 100 is shown in FIG. 2, in which the radio signals are transmitted in the opposite direction. Radio signals are transmitted by the radio frequency components 160, mixed and/or frequency converted by the frequency converting structures 150. The mixed and/or frequency converted radio signals are received by the antennas 120. The measurement arrangement 100 characterizes the radio frequency arrangement 110 by evaluating the mixed signals received by one or more of the antennas 120.

Benefits of the inventive measurement arrangement 100 is, that it allows to test large antenna arrays 110, such as communication or radar antennas. The measurement arrangement 100 also has a compact setup and is suitable for a production environment, as a reasonable number of testing channels can operate in parallel. Also, using a test probe adapter, which is specific for the antennas 120 of the DUT or for the antenna array 110, the measurement arrangement is manufacturable in a technology with reasonably low complexity, which keeps the production cost low and raises the number of potential manufacturers. A further advantage of the measurement arrangement 100 is that the number of radio frequency (RF) circuitry, such as radio frequency components 160, which are mainly transceivers, does not scale with the number of antennas 120 or radiators in the antenna array 110, with the exception of the frequency converting structures 150, which are, for examples, passive sensing and/or re-radiating elements required per-radiator or per-antenna. The measurement arrangement 100 may need thus only few mm-wave hardware.

As the number of radio frequency components is, in some embodiments, not scaling with the number of antennas of the DUT, the complexity, size and cost of the measurement arrangement remains low compared to the increasing number of antennas.

FIG. 2 shows a schematic representation of an embodiment of a measurement arrangement 200 similar to the measurement arrangement 100 of FIG. 1. The measurement arrangement 200 is configured to characterize a radio frequency arrangement 210 which comprises a plurality of antennas 220.

The measurement arrangement 200 further comprises a dielectric waveguide slab 230 with a plurality of frequency converting structures 250 arranged in or on the dielectric waveguide slab 230.

Along the circumference of the dielectric waveguide slab 230 are a plurality of waveguide transitions 240, coupling the dielectric waveguide slab 230 to respective radio frequency components 260.

The frequency converting structures 250 are associated with the respective antennas of the plurality of antennas 220. These associations are represented by arrows 225 of FIG. 2.

FIG. 2 shows additional optional elements when compared to FIG. 1. The measurement arrangement 200 of FIG. 2 comprises an evaluation circuitry 270 and a laser diode or a light-emitting diode 280 in addition to the elements of FIG. 1, while an extra zoomed-in area 252 explains, as an example, the parts and functioning of the frequency converting structures 250.

The evaluation circuitry 270 is coupled to the radio frequency components 260 and/or to the antennas 220 of the radio frequency arrangement 210 and/or with the receiver unit of radio frequency arrangement 210. The signal evaluation circuitry 270 is configured to evaluate the radio signals received either by (or using) the antennas 220 of the radio frequency arrangement 210 or by the radio frequency components 260 in order to characterize the radio frequency arrangement 210.

The frequency converting structures 250 are further explained in the zoomed-in area 252. The frequency converting structures 250 comprise an antenna structure 258, one or more non-linear elements 254 and a mode coupler or mode launcher 256.

The antenna structure 258 is coupled with the associated antenna 220 of the radio frequency arrangement 210 and with the one or more non-linear elements 254, such as diodes. The one or more non-linear elements 254 perform a frequency conversion on the radio signal received. The non-linear elements 254 are also coupled to the mode coupler 256 in order to couple the frequency converting structure 250 with the dielectric waveguide slab 230.

In other words, radio signals are received by the antenna structure 258 or by the mode coupler 256, frequency converted by the non-linear elements 254 and re-radiated by the mode coupler 256 or by the antenna structure 258.

The one or more non-linear elements 254 of the frequency converting structure 250 may, for example, comprise a Schottky-diode and/or a photodiode. The measurement arrangement 200 optionally also comprises one or more laser diodes or light-emitting diodes 280 allowing to illuminate the non-linear elements 254, like the photodiodes, e. g. selectively.

The light 290 of the laser diode or light-emitting diode 280 can bias the frequency converting structure 250 providing the frequency-converted signal, for example to reduce or even minimize a conversion loss of the frequency converting structure 250. The light 290 can also be modulated with a modulation frequency, for example such that the modulation frequency of the light 290 determines the frequency conversion of the frequency converting structure 250.

The measurement arrangement 200 characterizes the radio frequency arrangement 210 by evaluating the radio signals received by the antennas 220 of the radio frequency arrangement 210 or by receiver circuitry of the radio frequency arrangement 210. Radio signals 233 are transmitted by the radio frequency components 260 into the dielectric waveguide slab 230 through the waveguide transitions 240. The transmitted radio signals 233 are received by the mode coupler 256, frequency converted by the non-linear elements 254 and re-radiated by the antenna structure of the frequency converting structures 250. As the frequencies of the simultaneously transmitted radio signals 233 can differ, depending on the transmitting radio frequency component 260, the frequency converting structures 250 mixes (e.g. up-mixes or down-mixes) the received transmitted signals radio 233. The mixed signals 236 transmitted by the frequency converting structures 250 are received by the associated antennas 220 of the radio frequency arrangement. The evaluation circuitry 270 of the measurement arrangement 200 characterizes the radio frequency arrangement 210 by evaluating the mixed signals 236 received by the antennas 220 of the radio frequency arrangement 210.

The operation of the measurement arrangement 100 of FIG. 1 and the measurement arrangement 200 of FIG. 2 are different as the direction of the signals are reversed. That is, the upward-radiating (in z-direction or in the direction of the waveguide slab in the direction or towards the waveguide slab) antennas 120 of the patch antenna 110 of FIG. 1 is weakly sensed in the reactive near-field with a small loop or a small antenna structure of the frequency converting structures 150. The sensed or received signal is, for example, frequency-doubled (or frequency-converted) by the non-linear elements and re-radiated with the mode launcher or a z-directed dipole into the dielectric waveguide slab 130 within the board-plane (xy-plane) directions.

On the contrary, the operation of the measurement arrangement 200 of FIG. 2, the so-called receive-case, is more tricky. Instead of frequency doubling, the sensing element or the frequency converting structures 250 realizes the frequency difference at the patch received frequency f, from two incident signals, for example at 1.5 f and 2.5 f. For example, signals of frequencies 1.5f and 2.5f may be provided by one or more of the radio frequency components 260, and the frequency-converting structures may re-radiate a signal having a difference frequency of f.

In a practical implementation, most likely, a calibrated transmit test, such as the test shown in FIG. 1, is more important and practical than a full receive test, such as the receive test shown in FIG. 2.

Please note that the sensing elements or the frequency converting structures 150 of FIG. 1 or 250 of FIG. 2 contain few metal and are arranged in or on the dielectric waveguide slab 230 without metallic transmission or bias lines, which is almost transparent to the electromagnetic field. Dielectric structures related to the radio frequency arrangement of the device under test can be rather bulky, that is easily machined or 3D-printed.

FIG. 3a shows a picture of a conventional far-field radiation pattern measurement setup 310. It encompasses a mm-wave OTA test chamber 315 for design validation testing. FIG. 3a also shows a close-up picture of the test chamber 315.

By conventional methods, antenna arrays are tested by probing them at a large distance or far-field, which can be slightly less than one meter up to several meters, in an anechoic chamber/box environment. These measurements are slow, the equipment is large and the method is not suited for clean production environments.

FIG. 3b shows a conventional compact-range radiation pattern measurement setup 320 and its schematic representation 330. A more compact measurement setup 320 is realized by reducing the size using reflective elements 335.

Measurements of modules containing small arrays, such as 4-8 elements, can be tested at small distances, such as around half a meter, with few absorbers. This measurement is reasonably well suited for a production environment, but it is time-consuming as it tests the numerous array elements sequentially.

FIG. 4 shows a schematic representation of another conventional far-field test or measurement setup 400. The patch antenna for probing or testing and the single radiator of the DUT antenna array are in far-field distance of each other. This distance may be smaller than the far-field distance of the entire DUT antenna array, but the radiator elements of the DUT antenna array are activated sequentially. The measurement setup remains slow and the applied method is therefore not suited for a clean production environment.

FIG. 5 shows a schematic representation of a conventional measurement approach to measure modules containing small arrays, such as 4-8 elements with a probe adapter for probing the antenna elements in the reactive near-field. This measurement setup is very compact and allows for parallel measurement of antenna elements of the antenna array, therefore it is well-suited for a production test. The measurement setup has further variants, for measuring board-edge-radiating dipoles and a probe-in-ground arrangement for eWLB-packaged embedded antennas.

Disadvantage of this measurement setup is that for a given array topology, a rather complex purpose-made probe adapter is required, which suffers from further growing complexity as the number of antenna elements of the antenna array grows.

FIG. 6 shows a schematic representation of an exemplary radio frequency arrangement 600 of an assumed future handheld device to be measured in a measurement arrangement 100 of FIG. 1 or in a measurement arrangement 200 according to FIG. 2. The radio frequency arrangement 600 comprises a plurality of antennas 620. The radio frequency arrangement 600 comprises 14×26 antennas 620 configured to radiate or dual-pole radiate in the z-direction, see the corresponding coordinate system 630.

For best connectivity and energy efficiency during its operation it is assumed, as an example, that the form of a future handheld device will be completely covered with antennas. For example, at 30 GHz a 7 cm×13 cm area of the radio frequency arrangement 600 may contain 364 dual-pole radiators or antennas 620.

As FIG. 7 will show, the characterization of the assumed future handheld device, with for example more than 100 antennas 620, is hard to realize with conventional measurement arrangements suited for production environments, like the measurement arrangement 500 of FIG. 5.

However, the characterization can easily be performed in embodiments according to the present disclosures when, for example, one or few frequency converting structures may be associated with each of the antennas 620.

FIG. 7 shows a schematic representation of a hypothetical measurement arrangement 700 for characterizing an assumed radio frequency arrangement 710 of a future handheld device, similar to the measurement (or radio frequency) arrangement 600 of FIG. 6. The radio frequency arrangement 710 is characterized in a conventional reactive near-field test arrangement 720, similar to the near-field test arrangement 500 of FIG. 5. The hypothetical measurement arrangement 700 shows the drawbacks of the conventional reactive near-field test arrangement 720.

The near-field measurement arrangement 720 allows very localized measurements, but the number of test needles required exceeds the number of antennas. For example, one dual-linearly-polarized radiator, e.g. the patch or antenna of the radio frequency arrangement 710, requires up to eight test needles.

Further, highly parallel measurements are possible, but the number of mm-wave components may be required to scale with the number of antennas. That is, many mm-wave components are required for combining radio frequency (RF) signals and for test channel receivers.

A further disadvantage is that the layout for RF circuitry and for the test needles required to be very customized.

In other words, a 7 cm×13 cm area of a radio frequency arrangement 710, similar to the radio frequency arrangement 600 of FIG. 6, operated at 30 GHz, can contain 364 dual-pole radiators or antennas, thus requiring 2912 test needles plus a lot of RF circuitry. As the operational frequency gets higher, the number of radiators or antennas is expected to raise, as their physical size shrinks, thus the situation becomes worse. For example, at 60 GHz the number of test needles required is four times as much as at 30 GHz.

Looking at the hypothetical measurement arrangement 700, it becomes obvious that the concept of the conventional near-field measurement arrangement 720 reached its limitations and characterizing a radio frequency arrangement 710 with conventional measurement arrangement with near-field probes becomes unrealistic.

FIGS. 8a and 8b show a schematic representation of an embodiment of a test arrangement 800. The measurement arrangement (or test arrangement) comprises a radio frequency arrangement 810, similar to the radio frequency arrangement 600 of FIG. 6, comprising a plurality of antennas 820. The measurement arrangement 800 further comprises a dielectric waveguide slab 880 with a plurality of waveguide transitions 840 located at the circumference of the dielectric waveguide slab 880. The waveguide transitions couple the dielectric waveguide slab 880 with the radio frequency components 860. The frequency converting structures of the dielectric waveguide slab 880 which are coupled to respective antennas 820 of the radio frequency arrangement 810 are not shown in FIGS. 8a and 8b to avoid the FIGS. 8a, 8b being overcrowded.

Both FIGS. 8a and 8b show the same measurement arrangement 800. Therefore the structural description of FIG. 8b is the same as the structural description of FIG. 8a.

FIG. 8b shows that the radio frequency arrangement 810 or the large antenna array is probed circumferentially in xy-plane with few, in this case six test transceivers 860. For example, a single antenna 825 of the antenna array 810 transmits a radio signal 829, which is guided through the waveguide slab 880 and through the waveguide transitions 840 to the radio frequency components 860, such as transceivers 860.

In another example, a few, in this case six test transceivers 860 transmit radio signals coherently at the same time into the waveguide slab 880 through the waveguide transitions 840. The signals interfere constructively at the location of the highlighted single receive antenna 825 of the radio frequency arrangement 810.

The radio frequency arrangement 810 is, for example, characterized by evaluating the signals 829 transmitted by the antennas 820 (or by a single antenna out of the antennas 820) and received by the radio frequency components 860. The information used for characterizing the radio frequency arrangement 810 is, for example, the radiation strength, which can be derived from the amplitude and/or phase information (e.g. of radio signals received by the radio frequency components 860) and the location of a patch or antenna element which can, for example, be found by or derived from a triangulation.

Parallel characterization of antennas is also possible, for example by acquiring a code-division multiple access (CDMA) signal coding. For example, it may be determined, using a triangulation, from which frequency converting structure radio signals received by one or more of components originate. Alternatively or in addition, individual frequency converting structures may selectively be enabled and disabled, e. g. using a selective illumination.

Alternatively or in addition, individual frequency converting structures may be modulated with different modulation signals, which allows for a distinction of radio signals radiated from different frequency conversion structures. Accordingly, radio signals originated from different frequency converting structures may be distinguished.

FIG. 9a shows a schematic representation of an embodiment of a measurement arrangement 900 for characterizing a radio frequency arrangement 930, similar to the measurement arrangement 800 of FIG. 8b. The measurement arrangement 900 comprises frequency converting structures 950 placed in the near-field regions of the antennas.

FIG. 9a further shows the frequency converting structures 950 and their mount 960 in an area 910, which is magnified and explained in 910 of FIG. 9b.

FIG. 9b shows that the frequency converting structure comprises an antenna structure 952, one or more non-linear elements 954 and a mode launcher 956. The antenna structure couples with a field of a respective antenna of the plurality of antennas. The one or more non-linear elements are coupled to both to the antenna structure and to the mode coupler. The one or more non-linear elements are configured to perform a frequency conversion. The mode coupler is configured to excite a radiation, for example omni-directional, in the xy-plane.

Antennas of the radio frequency arrangement transmit radio signals, e.g. predominantly in the z-direction (see the orientation of the coordinate system 920). A portion of this radio signal is obtained by the antenna structure 952 of the frequency converting structure 950. The frequency of the received radio signal is converted by the non-linear element 954 of the frequency converting structure 950, and transmitted by the mode coupler in the xy-plane.

FIG. 9b shows the mount 960 of the frequency converting structure 950 as well. Portions of signals not received by the frequency converting structures 950 are, for example, absorbed by absorbers 980.

The mount 960 is considered an inferior alternative to the dielectric waveguide slab, as the frequency converting structures 950 are mounted on dielectric posts 970. Manufacturing a large number of dielectric posts 970 are more complex and more expensive than manufacturing a dielectric slab. The usage and benefits of a dielectric waveguide slab are explained in the following figures.

FIGS. 10a-b show a schematic representation of an embodiment of a measurement arrangement section 1000 with a dielectric waveguide slab 1030 which is part of a measurement arrangement, similar to the measurement arrangement 100 of FIG. 1.

Both, FIG. 10a and FIG. 10b comprise a patch antenna array or a radio frequency arrangement 1010 similar to the radio frequency arrangement 110 of FIG. 1. The single antennas 1010a-c of the patch antenna array 1010 are configured to transmit signals, e. g. predominantly in direction z. A dielectric slab 1030 is arranged in a reactive near-field of the antenna array 1010. On the other side of the dielectric slab 1030, opposite to the patch antenna array 1010, absorbers 1070 are (optionally) located.

FIG. 10a shows that the dielectric slab 1030 is (almost) transparent to the radio signal 1090 of the antennas 1010a-c of the patch antenna array 1010, as the thickness of the dielectric slab is, for example, less than half of a free-space wavelength of the radio signal 1090 transmitted by the antenna elements 1010a-c.

FIG. 10a also shows that the dielectric slab 1030 does not (or not significantly) reflect the radio signals 1090 of the antennas 1010a-c. Therefore, the dielectric slab 1030 located in the reactive near-field of the antenna array 1010 does not (or not significantly) affect the antennas 1010a-c or the radiator elements.

FIG. 10b has a similar layout, that is, the measurement arrangement section 1000 comprises a patch antenna array 1010 with three antenna elements 1010a-c, a dielectric slab 1030 within the near-field range of the antennas 1010a-c and (optionally) absorbers 1070 located on the opposite side of the dielectric slab 1030, opposite to the patch antenna array 1010.

Compared to FIG. 10a, the dielectric slab 1030 of FIG. 10b comprises an additional frequency converting structure

1050. It is shown in FIG. 10*b* that the antenna element 1010*b* transmits a radio signal 1090 in z-direction. A portion of the transmitted radio signal is received by the antenna structure of the frequency converting structure 1050. The frequency converting structure 1050 operates similarly to the frequency converting structure 950 of FIG. 9. The antenna structure is coupled to the non-linear elements which are configured to perform a frequency conversion of the signal received. The non-linear elements are coupled to a mode coupler, so that the frequency-converted signal 1080 is coupled to a mode in the dielectric slab 1030. The frequency-converted signal 1080 in the dielectric slab is, for example, an omni-directional signal spreading within the dielectric slab 1030. In other words, the frequency converting structure 1050 or the frequency-translating device locally excites a slab-guided surface-wave. However, the slab-guided surface wave may also be directed into one or more directions. The slab guided wave may be received, for example at the circumference of the dielectric slab, using appropriate radio frequency components.

FIG. 11 shows a schematic representation of an embodiment of a measurement arrangement 1100, similar to the measurement arrangement 100 of FIG. 1, indicating losses that the radio signal suffers between the antenna 1120 and the radio frequency components 1160. The measurement arrangement 1100 comprises an antenna 1120, a dielectric slab 1130 with a frequency converting structure or sensor 1150 within the near-field range of the antenna 1120. The measurement arrangement 1100 further comprises a waveguide transition 1140 coupled to the dielectric waveguide slab 1130 and to a radio frequency component 1160.

FIG. 11 shows that the patch antenna 1120 is transmitting a radio signal 1170 with a frequency $f_0$. On the distance between the patch antenna 1120 and the dielectric waveguide slab 1130 the radio signal suffers a transmission loss which is indicated by $Loss_1$.

The frequency converting structure 1150 of the dielectric waveguide slab 1130 converts the frequency $f_0$ of the received radio signal 1170 into a frequency-converted signal 1180 with a higher frequency, such as $2f_0$, doubling the frequency of the transmitted radio signal 1170. The signal suffers a frequency conversion loss, indicated by mixLoss.

The frequency converting structure 1150 couples the frequency-converted signal 1180 into the dielectric slab 1130, in which the frequency-converted signal 1180 is guided to the radio frequency component 1160 through the waveguide transition 1140. Over the distance between the frequency converting structure 1150 and the radio frequency component 1160, the frequency-converted signal suffers a transmission loss of $Loss_2$.

The total transmission loss between the antenna 1120 and radio frequency component 1160 is a sum of the above-described losses, that is: $Loss_1+mixLoss+Loss_2$. Cascaded loss contributions are added as they are assumed in logarithmic measure, such as decibel (dB). Evidently, cascaded loss contributions would multiply if in linear scale.

It should be noted, that the total loss has been found acceptable over a wide range of topologies, such that a reliable characterization of the DUT is typically possible.

FIG. 12*a* shows a diagram 1230 comparing different measurement arrangements. In particular, the diagram compares measurement arrangements comprising a plurality of frequency converting structures in or on a dielectric waveguide slab (see the measurement arrangement of FIG. 12*c*), a measurement arrangement comprising frequency converting structures without the dielectric slab (see the measurement arrangement of FIG. 12*b*) and a measurement arrangement which comprises neither a dielectric waveguide slab nor frequency converting structures (the measurement arrangement is not shown in any figure).

FIG. 12*a* shows a diagram 1230 showing the reflection coefficient at the input port of an antenna element or of a patch by the different measurement arrangements. As the diagram 1230 shows, the different measurement arrangements were compared at a frequency of 28 GHz and the measured reflection coefficients were between −25 and −32.5 dB.

FIG. 12*b* and FIG. 12*c* are showing schematic representations of the two of the compared measurement arrangements. FIG. 12*b* shows a measurement arrangement 1210 comprising an input port 1250 coupled to the antenna patch 1240, a frequency converting structure 1260 or sensor, and a radio frequency component or probe 1270.

The antenna element 1240 transmits a radio signal to the frequency converting structure 1260, which receives a portion of the radio signal, converts the frequency of the radio signal to a higher frequency, and transmits the frequency-converted signal in the xy-plane coupling the signal with a radio frequency component 1270. Another portion of the radio signal is reflected back in the direction of the antenna element. The reflection coefficient shows how much the reflected signal of the transmitted signal affects the antenna itself.

FIG. 12*c* shows a measurement arrangement 1220, similar to the measurement arrangement 1210 of FIG. 12*b* comprising an additional dielectric waveguide slab 1280. The dielectric waveguide slab 1280 comprises the frequency converting structure 1260 which couples the frequency-converted signal with the dielectric slab 1280. The dielectric waveguide slab 1280 guides the frequency-converted signal from the frequency-converting structure 1260 to the radio frequency component 1270.

It can be seen from the comparison, or in the diagram 1230, the measurement arrangement with a frequency converting structure or sensor and with a dielectric waveguide slab is the most reflective, while the measurement arrangement with frequency converting structures without dielectric slab is the least reflective. Evidently, the disturbances caused by slab and/or frequency converting structure are small.

FIG. 13*a* shows a diagram 1310 comparing the transmissions from patch antenna to the sensor or to the frequency converting structure with a dielectric waveguide slab and without a dielectric waveguide slab. There is an around 7.5 dB difference between the transmission coefficients of the measurement arrangements with or without dielectric slab.

The diagram 1310 also shows that the measurement arrangement with a dielectric waveguide slab has a 7.5 dB higher transmission coefficient when compared to the measurement arrangement without a dielectric waveguide slab. This means that in the measurement arrangement with a dielectric waveguide slab a bigger portion of the transmitted signal will be received by frequency converting structures when compared to the measurement arrangement without a dielectric waveguide slab.

In other words, this difference is due to a larger electrical length of the sensor antenna in the dielectric waveguide slab ($\in_r=6$) compared to free space.

A schematic representation of a portion of the measurement arrangement with a slab 1320 is shown in FIG. 13*b*. The measurement arrangement portion 1320 comprises an antenna 1330 transmitting a signal 1340 in the direction of the frequency converting structure 1350 within the dielectric waveguide slab 1360. FIG. 13*b* explains the transmission from an antenna to the frequency converting structure.

FIG. 14a shows a schematic representation of a portion 1400 of the measurement arrangement comprising a frequency converting structure 1410 transmitting a frequency-converted signal 1420 which is guided through a dielectric waveguide slab 1430 to a radio frequency component 1440 through a waveguide transition 1450. FIG. 14a explains the transmission from the frequency converting structure 1410 to the radio frequency components 1440.

FIG. 14b shows simulated absolute values of an electrical field of a signal transmitted by the frequency-converted structure to the radio frequency component in a measurement arrangement without a dielectric waveguide slab.

FIG. 14c shows simulated absolute values of an electrical field of a signal transmitted by the frequency-converted structure to the radio frequency component in a measurement arrangement with a dielectric waveguide slab.

Comparing the simulations of FIGS. 14b and 14c, a bigger portion of the transmitted frequency-converted signal remains guided within the slab in the measurement arrangement with a dielectric waveguide slab.

Similar results are provided by the diagram 1470 of FIG. 14d. FIG. 14d shows a diagram comparing the transmission coefficients curves of two measurement arrangements, one without a dielectric waveguide slab and one with a dielectric waveguide slab. The diagram 1470 further comprises a simulated transmission coefficient curve, which is a scaled version of the curve of the measurement arrangement without a dielectric waveguide slab. Placing the sensor antenna in free space reduces its electrical length causing less radiated power. In order to fairly compare the sensor, it is scaled to obtain the same electrical length in the free space, as it is in the dielectric waveguide slab.

As shown in both, FIG. 13a and FIG. 14d, the transmission coefficients of the signal transmitted from the antenna element of the patch antenna array to the radio frequency components are the highest if a dielectric waveguide slab is used. This transmission increase is significant. For example, the combined transmission increase in the examples of FIG. 13a and FIG. 14d is about 30 dB.

Accordingly, an accurate characterizing of a device under test is possible.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the disclosure can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the disclosure comprise a data carrier having electronically readable control signals, which are capable of cooperating with a programmable computer system, such that one of the methods described herein is performed.

Generally, embodiments of the present disclosure can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus in an embodiment.

The above described embodiments are merely illustrative for the principles of the present disclosure. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The foregoing descriptions of specific embodiments have been presented for purposes of illustration and description. They are not intended to be exhaustive or to limit the disclosure to the precise forms disclosed, and many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is intended that the scope of the disclosure be defined by the Claims appended hereto and their equivalents.

What is claimed is:

1. A measurement arrangement comprising:
   a dielectric waveguide slab comprising a plurality of frequency converting structures arranged in at least one of in the dielectric waveguide slab or on the dielectric waveguide slab, wherein the plurality of frequency converting structures are configured to perform a frequency conversion on received radio signals from a radio frequency arrangement to generate frequency-converted signals, wherein the radio frequency arrangement comprises a plurality of antennas, wherein the plurality of frequency converting structures are associated with respective antennas of the plurality of antennas;

a plurality of radio frequency components configured to perform at least one of transmit radio signals or receive the radio signals; and a plurality of waveguide transitions arranged at different positions of the dielectric waveguide slab and coupled to a respective radio frequency component of the plurality of radio frequency components, wherein the plurality of frequency converting structures are configured to couple the respective antennas with the dielectric waveguide slab in a frequency converting manner to establish a frequency-converting coupling between the plurality of antennas and the plurality of waveguide transitions to cause a frequency-converting coupling between the plurality of antennas and the plurality of radio frequency components; and wherein the frequency-converting coupling between the plurality of antennas and the plurality of radio frequency components enables characterization of the radio frequency arrangement.

2. The measurement arrangement according to claim 1, further comprising a signal evaluation circuitry coupled to the plurality of radio frequency components and configured to characterize the radio frequency arrangement by evaluating the radio signals received by the plurality of radio frequency components, wherein the radio signals received by the plurality of radio frequency components are based on radio signals transmitted by the plurality of antennas and frequency converted by the frequency-converting coupling between the plurality of antennas and the plurality of radio frequency components.

3. The measurement arrangement according to claim 2, wherein the signal evaluation circuitry is configured to locate an antenna that is transmitting by using a triangulation.

4. The measurement arrangement according to claim 1, further comprising a signal evaluation circuitry configured to characterize the radio frequency arrangement by evaluating radio signals received by the plurality of antennas, wherein the radio signals received by the plurality of antennas are based on the radio signals transmitted by the plurality of radio frequency components and frequency converted by the frequency-converting coupling between the plurality of antennas and the plurality of radio frequency components.

5. The measurement arrangement according to claim 4, wherein the plurality of radio frequency components are configured to transmit the radio signals comprising different frequencies.

6. The measurement arrangement according to claim 4, wherein the plurality of radio frequency components are configured to simultaneously transmit radio signals at two different frequencies, which are mixed by the plurality of frequency converting structures, and wherein an evaluation of a mixed signal based on simultaneously transmitted radio signals facilitates characterization of the radio frequency arrangement.

7. The measurement arrangement according to claim 4, wherein the plurality of radio frequency components are configured to simultaneously transmit radio signals at two or more different frequencies, wherein separate branches of the radio frequency arrangement are simultaneously tested by using different radio signals of the two or more different frequencies.

8. The measurement arrangement according to claim 1, wherein the dielectric waveguide slab comprises a thickness of less than a half of a free-space wavelength of the radio signal transmitted by at least one of one or more of the plurality of antennas or one or more of the plurality of radio frequency components.

9. The measurement arrangement according to claim 1, wherein the dielectric waveguide slab comprises one or more layers.

10. The measurement arrangement according to claim 9, wherein the one or more layers of the dielectric waveguide slab comprises at least one of silicon, quartz, polymer, or ceramics.

11. The measurement arrangement according to claim 1, wherein the plurality of frequency converting structures are arranged in a reactive near field of a respective associated antenna of the plurality of antennas.

12. The measurement arrangement according claim 1, wherein each frequency converting structure comprises:

an antenna structure configured to couple with a field of a respective antenna of the plurality of antennas;

a mode coupler configured to couple a corresponding frequency converting structure to the dielectric waveguide slab; and one or more non-linear elements coupled to the antenna structure and to the mode coupler, wherein the one or more non-linear elements are configured to perform a frequency conversion.

13. The measurement arrangement according to claim 12, wherein the antenna structure of the corresponding frequency converting structure is smaller than an associated antenna of the plurality of antennas.

14. The measurement arrangement according to claim 12, wherein at least one of the antenna structure of the corresponding frequency converting structure or the corresponding frequency converting structure is arranged in an environment of a radiating edge of an associated patch-type antenna of the plurality of antennas.

15. The measurement arrangement according to claim 12, wherein the one or more non-linear elements comprise at least one of silicon or gallium arsenide.

16. The measurement arrangement according to claim 12, wherein the one or more non-linear elements comprise a Schottky-diode.

17. The measurement arrangement according to claim 12, wherein the one or more non-linear elements comprise a photodiode configured to bias the corresponding frequency converting structure when illuminated.

18. The measurement arrangement according to claim 17, wherein the photodiode is configured to reduce a conversion loss of the corresponding frequency converting structure when illuminated.

19. The measurement arrangement according to claim 17, wherein the photodiode is configured to selectively activate the corresponding frequency converting structure when illuminated.

20. The measurement arrangement according to claim 17, wherein the photodiode is configured to generate an alternating signal when illuminated with a modulated light.

21. The measurement arrangement according to claim 20, wherein the photodiode is irradiated with the modulated light that is modulated with a modulation frequency, and wherein the corresponding frequency converting structure is configured in a manner in which a frequency difference between a frequency of an incoming radio signal of the corresponding frequency converting structure and a frequency of an outgoing radio signal of the corresponding frequency converting structure is determined by the modulation frequency.

22. The measurement arrangement according to claim 21, further comprising at least one of one or more laser diodes or one or more light-emitting-diodes configured to illuminate the photodiode of one or more corresponding frequency converting structures.

23. The measurement arrangement according to claim 1, wherein a frequency of at least one of the radio signal or a frequency-converted signal is between 30 GHz and 300 GHz.

24. The measurement arrangement according to claim 1, wherein at least one of the radio signal or a frequency-converted signal comprises a chirp signal.

25. An automated test equipment comprising:
 a device under test (DUT) location for a DUT comprising a plurality of antennas;
 a dielectric waveguide slab comprising a plurality of frequency converting structures arranged in at least one of in the dielectric waveguide slab or on the dielectric waveguide slab, wherein the plurality of frequency converting structures are configured to perform a frequency conversion on received radio signals from the DUT to generate frequency-converted signals, wherein the plurality of frequency converting structures are associated with respective antennas of the plurality of antennas;
 a plurality of radio frequency components configured to perform at least one of transmit radio signals or receive the radio signals; and
 a plurality of waveguide transitions arranged at different positions of the dielectric waveguide slab and coupled to a respective radio frequency component of the plurality of radio frequency components, wherein the plurality of frequency converting structures are configured to couple the respective antennas with the dielectric waveguide slab in a frequency converting manner to establish a frequency-converting coupling between the plurality of antennas and the plurality of waveguide transitions to cause a frequency-converting coupling between the plurality of antennas and the plurality of radio frequency components, and wherein the frequency-converting coupling between the plurality of antennas and the plurality of radio frequency components enables characterization of the DUT.

26. A method comprising:
 establishing a frequency-converting coupling between at least one antenna of a plurality of antennas of a device under test (DUT) and a plurality of waveguide transitions arranged at different positions of a dielectric waveguide slab to cause a frequency-converting coupling between the plurality of antennas and a plurality of radio frequency components configured to perform at least one of transmit radio signals or receive the radio signals, wherein the dielectric waveguide slab comprises a plurality of frequency converting structures, wherein a frequency conversion is performed on radio signals received by the plurality of frequency converting structures arranged in at least one of in the dielectric waveguide slab or on the dielectric waveguide slab; and
 using the frequency-converting coupling between the plurality of antennas and the plurality of radio frequency components to characterize the DUT.

27. The method according to claim 26, further comprising: performing a characterization of the DUT by evaluating radio signals transmitted by the plurality of antennas, frequency converted by the frequency-converting coupling between the plurality of antennas and the plurality of radio frequency components, and received by the plurality of radio frequency components.

28. The method according to claim 26, further comprising: performing a characterization of the DUT by evaluating radio signals which are based on radio signals transmitted by the plurality of radio frequency components, frequency converted by the frequency-converting coupling between the plurality of antennas and the plurality of radio frequency components, and received by the plurality of antennas.

\* \* \* \* \*